United States Patent [19]
Denton

[11] Patent Number: 5,923,653
[45] Date of Patent: Jul. 13, 1999

[54] SONET/SDH RECEIVER PROCESSOR

[75] Inventor: I. Claude Denton, Portland, Oreg.

[73] Assignee: Tektronix, Inc., Wilsonville, Oreg.

[21] Appl. No.: 08/580,786

[22] Filed: Dec. 20, 1995

Related U.S. Application Data

[63] Continuation of application No. 08/426,330, Apr. 21, 1995, abandoned.

[51] Int. Cl.$^6$ ....................................................... H04J 3/02
[52] U.S. Cl. ........................... 370/375; 370/428; 370/535
[58] Field of Search ................................. 370/375, 376, 370/539, 541, 542, 536, 474, 476, 907, 535, 428; 359/135

[56] References Cited

U.S. PATENT DOCUMENTS

| | | | |
|---|---|---|---|
| 4,998,242 | 3/1991 | Upp | 370/392 |
| 5,031,129 | 7/1991 | Powell et al. | 364/717.04 |
| 5,040,170 | 8/1991 | Upp et al. | 370/358 |
| 5,197,064 | 3/1993 | Chao | 370/94.1 |
| 5,241,602 | 8/1993 | Lee et al. | 380/44 |
| 5,355,238 | 10/1994 | Kight et al. | 370/60.1 |
| 5,365,518 | 11/1994 | Noser | 370/426 |
| 5,666,351 | 9/1997 | Oksanen et al. | 370/503 |
| 5,675,580 | 10/1997 | Lyon et al. | 370/250 |
| 5,781,527 | 7/1998 | Read et al. | 370/244 |

OTHER PUBLICATIONS

Bagheri et al., "An STS–N Byte–Interleaving Multiplexer/Scrambler and Demultiplexer/Descrambler Architecture and its Experimental OC–48 Implementation", IEEE, Jun. 1993.

*Primary Examiner*—Min Jung
*Attorney, Agent, or Firm*—Brent F. Logan; William K. Bucher; Francis I. Gray

[57] ABSTRACT

A receiver processor for use in a SONET OC-48 or SDH test or network environment. The processor includes a 16:32 demultiplexer, descrambler, and a cross-connect enabling individual STS-3s in the incoming signal to be routed to selected STS-3s in the outgoing signal. An overhead and data capture function enables overhead and data bytes to be captured from each frame.

15 Claims, 16 Drawing Sheets

SONET/SDH RECEIVER PROCESSOR

This is a continuation application of pending prior application Ser. No. 08/426,330, filed on Apr. 21, 1995 now abandoned.

TECHNICAL FIELD

The invention relates generally to Sonet/SDH communication networks, and more particularly to a receiver processor for performing receive-side overhead processing and STM-1/STS-3-level reorganization functions.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND ART

The Synchronous Optical Network (SONET) and Synchronous Digital Hierarchy (SDH) standards specify rates and formats for synchronous digital optical communication networks intended for use in telephony and at the lowest layer of Integrated Services Digital Networks (ISDNs). They establish a hierarchy of data transfer rates extending from a level that might be required by a small group of users (51.84 Mb/s), to a level that is suitable for long-haul carrier operations (2.488 Gb/s). The expected uses of the networks demand provisions for multiplexing lower-rate signals together into a higher rate signal for long-distance transmission, monitoring system performance to ensure reliability, and communicating maintenance information among nodes in the network without interrupting normal service. The synchronous nature of the network necessitates a means of extracting timing information from an incoming data stream and recognizing timing failures. The standards answer these concerns by establishing a frame structure within the transmitted signal and dividing each frame into a payload and an overhead section. The frame structure supports multiplexing by allowing high rate signals to be specified in terms of combinations of lower rate signals. The payload section is filled with the data to be transmitted across the network, while the overhead section allows the insertion of synchronization strings, parity check bytes, and maintenance communication channels.

Different elements in the transmission network need access to different amounts of knowledge about the data being transmitted. An end receiver, for instance, must establish synchronization with the frame structure of the incoming signal, check it for data integrity, process any maintenance messages that may accompany it, pass information to its companion transmitter, and extract the payload data. A mid-network regenerator need only synchronize with the data, check for any signal error conditions, and re-transmit the data. A multiplexer lies somewhere in between.

The standards codify these differences by establishing four layers of access to the SONET/SDH stream: photonic (or physical), section, line, and path. An element that changes the stream at one of these levels is called a terminating element of that layer, and is required to interpret the associated overhead.

Referring to FIG. 1, a SONET 2.488 Gb/s (OC-48) signal 20 is graphically represented showing its frame structure and the named section overhead bytes 22 and line overhead bytes 24.

Conceptually, the frame of any higher-rate signal in the SONET hierarchy is built by byte-interleaving frames of 51.84 Mb/s (OC-1) signals. Thus an OC-48 frame 20 can be depicted as a three-dimensional structure of depth 28 of 48 tiers, where each tier is an OC-1 frame 28. An OC-1 frame 28 is transmitted one byte at a time, stepping along the rows 30 (i.e. A1, A2, C1, ..., B1, E1, F1, ...), so the byte interleaving process used to construct higher-rate frames results in a transmission indexed first by depth 26, then along the rows 30 (i.e. A1, A1, ..., A2, A2, ...). This formalization allows the time duration of a SONET frame 20 to be the same at every rate, 125 μs, and ensures that the bytes of the framing pattern (A1, A2) are always transmitted at the beginning of the frame.

Many of the overhead bytes 22, 24 are defined only for the first OC-1 tier 28a of a higher rate signal; for instance, the byte behind the B1 byte referred to by 32 serves no defined function. Other overhead bytes are defined for all tiers. In the following discussion, it is assumed that an overhead byte is defined unless otherwise explicitly noted.

The section overhead 22 consists of the named bytes A1, A2, C1, B1, E1, F1, and D1–D3. The A1 and A2 bytes together form the pattern by which the beginning of a frame can be recognized, and as such are defined for all 48 OC-1s 28 of an OC-48 signal 20. They always hold the same values: A1=F6, A2=28 in hexadecimal notation. The C1 byte was originally designated as an OC-1 identification byte, defined for all OC-1s, but is currently under study for use as a section trace indicator to identify physical connections, defined only for the first 16 tiers 28. The B1 byte is used to perform a single eight-bit bit-interleaved-parity error check covering the entirety of the previous OC-48 frame. The E1 byte carries the section orderwire channel, defined as a 64 kb/s serial channel (8 bits per frame, 8000 frames per second) for network equipment communications. The F1 byte is designated for use as a 64 kb/s user channel for implementation-specific purposes. The D1–D3 bytes form the section data communication channel, a 192 kb/s control channel for section layer network elements.

The line overhead 24 consists of the H1–H3, B2, K1–K2, D4–D12, Z1–Z2, and E2 bytes. Bytes H1, H2, and H3 are defined for all 48 tiers of the frame 20 and are used as a pointer to, and a stuff byte for, the payload data 34. The B2 byte is also defined for all 48 tiers 28; each of these 48 bytes serves as an eight-bit bit-interleaved-parity checksum for the line overhead 24 and payload envelope 34 of the STS-1 in the same tier 28 of the previous frame. The K1 and K2 bytes carry the automatic protection switching channel. The line data communication channel is carried in bytes D4–D12. It is a 576 kb/s channel analogous to the section data communication channel. The Z1 and Z2 bytes are designated as growth bytes in all 48 tiers. Only two have thus far been explicitly defined: the first Z1 byte is to be used as a synchronization status byte, redesignated S1, and the third Z2 byte, redesignated M1, is to be used to transmit a far-end-bit-error count back from remote receivers on two-way links. The E2 byte carries the line orderwire channel, a 64 kb/s channel analogous to the section orderwire.

A significant number of useful intra-network entities perform processing at the photonic, section, and line levels, but do not interact with payload data, i.e. the path level. These include all varieties of multiplexers. In addition, all elements that do manipulate payload data 34 must first resolve section and line overhead 22, 24. A processor that can provide required overhead interpretation functions at the section and line levels, as well as some signal rearrangement at those levels, is thus a general and useful element. There are a few commercially available processors that perform section and line overhead termination at SONET rates up to 622 Mb/s (OC-12), and at least one that performs limited termination functions for OC-48. No available overhead processor is available that offers signal rearrangement functions, or capture functions flexible enough to access new overhead bytes as the standards define them.

In the interest of brevity, only SONET terminology will be used in most descriptions. Unless specifically noted, the discussion also applies to the corresponding SDH requirements. The abbreviations STS-N and OC-N are used to refer to the (possibly parallelized) SONET-derived stream with a total data rate of N times the base rate of 51.840 Mb/s. Thus OC-48 and STS-48 refer to a 2.488 Gb/s stream, OC-12 and STS-12 to a 622.080 Mb/s stream, and so on. This notation implies SONET framing conventions.

DISCLOSURE OF THE INVENTION

A SONET/SDH receiver processor according to the present invention supports three types of functions: data processing, overhead processing and control.

As feature of the present invention, the receiver processor is able to reorganize an STS-48 signal at the STS-3 level.

As another feature, the receiver processor is able to selectively capture predefined bytes in the signal overhead and a plurality of selected bytes anywhere within the signal frame, whether in the overhead or synchronous payload envelope.

As yet another feature, the receiver processor is able to disable further capture of overhead and data bytes, enabling a host system sufficient time to access the captured information.

The receiver processor is also able to provide an interrupt signal to a host system in response to a triggering event. The triggering event can be any of a set of prespecified conditions or a change in the data stream flow. The change can be a change in a selected byte anywhere in the signal frame. Furthermore, in response to the change, the receiver processor is able to cease capturing overhead and data bytes.

These and other features, advantages, and objects of the present invention will become apparent to those skilled in the art upon examination of the following specification when taken in conjunction with the drawings.

DETAILED DESCRIPTION OF THE INVENTION

The host system of a receiver processor ASIC according to the present invention is a general receiver for use in physical, section, and line terminating nodes in a SONET network. The SONET standard describes the receive functions required of such nodes. A physical terminator must provide optical-to-electrical and electrical-to-digital signal conversions according to strict specifications that ensure low error rates. A section terminating element must perform framing, descrambling, overhead extraction, and error monitoring functions on the digital signal. A line terminating element then provides multiplexing, protection switching, overhead recovery, and further error monitoring functions. After all these operations have been performed, the payload of the signal may be extracted by a path terminating element, or the signal may be reorganized and transmitted further. Since the use of overhead processing operations varies among network elements, a general control and data interface between the receiver and the element in which it resides should be specified.

Figure 2:
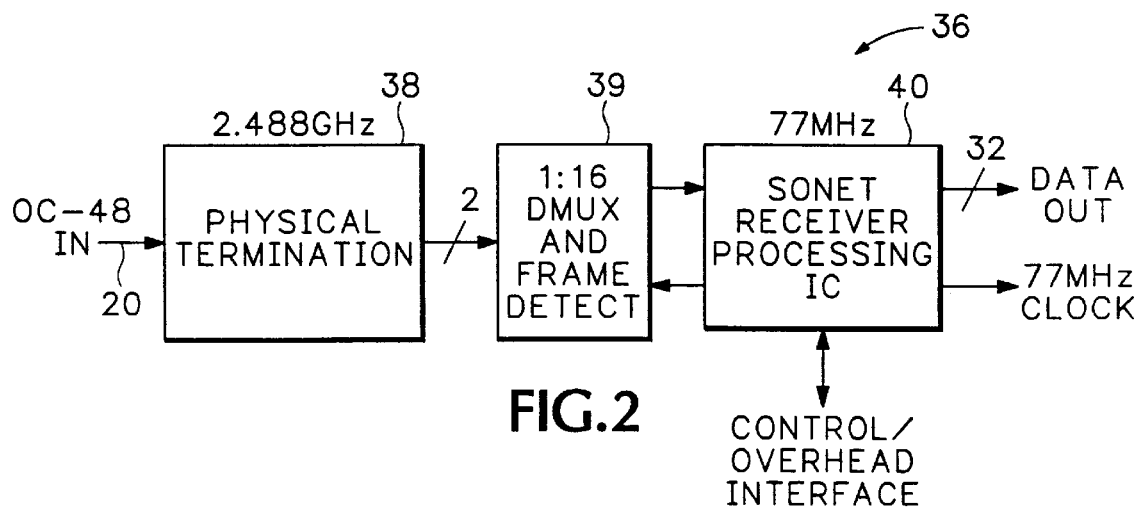
FIG. 2 is a block diagram of a receiver system architecture incorporating a receiver processor according to the present invention.

Given these required attributes, a number of system architectures could be proposed. Referring now to FIG. 2, the receiver processor design presented here assumes a system 36 partitioned according to clock rate. The 2.488 Gb/s data rate of the incoming OC-48 implies that physical layer termination 38 will result in a 2.488 GHz clock synchronized to a serial data stream. The section terminating subsystem must contain extremely fast circuit elements to handle these signals. On the other hand, the complexity of logic and amount of memory required to implement section and line terminating functions make ease of design and circuit density important considerations. These conflicting requirements can be satisfied by developing circuits in a high-speed, low-density device technology such as GaAs or high-speed bipolar Si that accept the serial stream and slow its clock rate through parallelization. The bulk of the processing functions can then be realized in a relatively low-speed, high-density technology such as CMOS. The availability of standard cell libraries and hardware description language development environments for CMOS ASIC design makes the implementation of these low speed circuits relatively easy. A diagram of the blocks resulting from this partitioning is shown in FIG. 2.

The SONET Receiver Processing IC 40 is the focus of this patent document. It is called the SONET Overhead Recovery and Cross Connect IC (SORCC).

Figure 3:
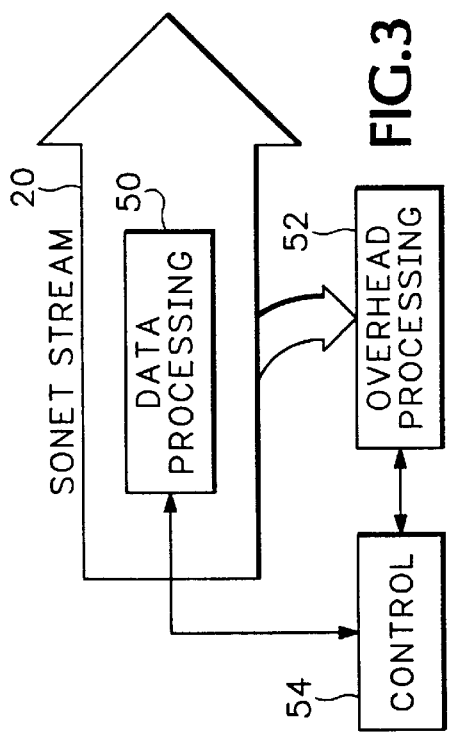
FIG. 3 is a functional diagram showing the operations of a receiver processor.

Referring now to FIG. 3, the SORCC 40 supports three types of operations: data processing 50, overhead processing 52, and control 54. Its architecture recognizes these three categories and reflects them as three subsystems within the IC 40. Each subsystem function corresponds to a termination operation required by the SONET standard or an interface element required by the system architecture. FIG. 3 illustrates the position of these subsystems with respect to the SONET stream 20.

Figure 4:
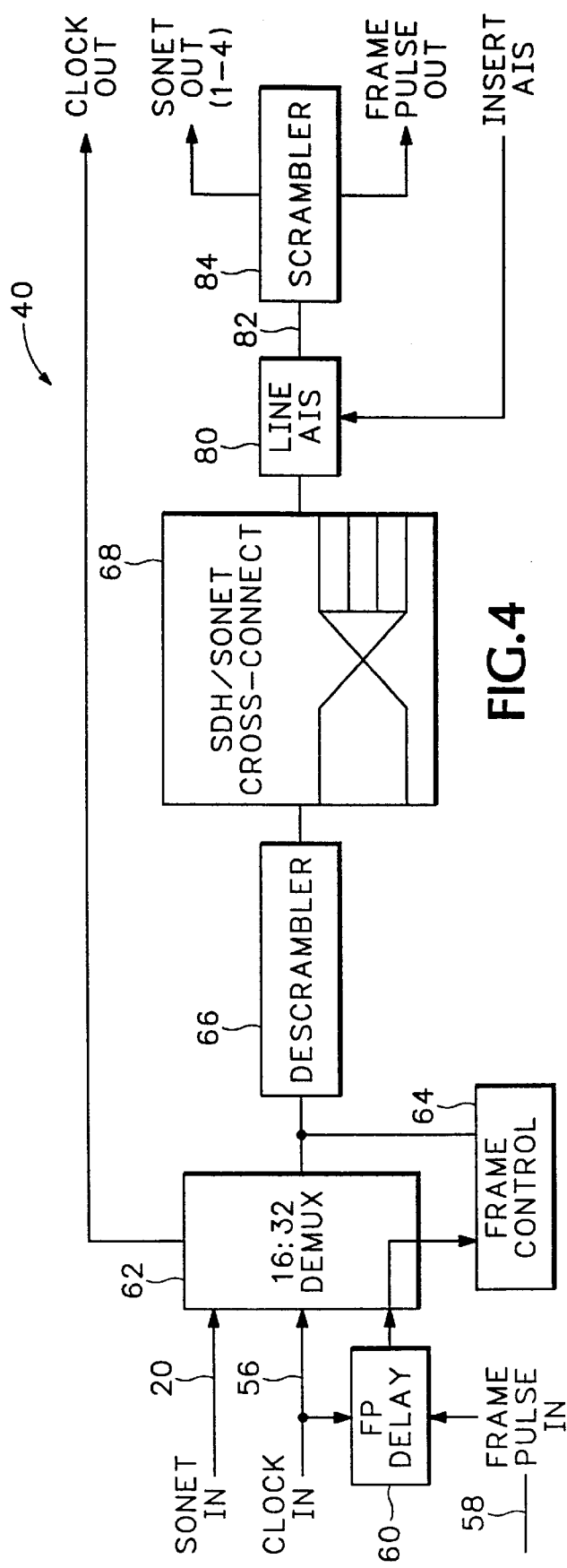
FIG. 4 is a block diagram of the data path of the receiver processor.

FIG. 4 shows the blocks that make up the data path through the SORCC 40. The data path has as its inputs the 16-bit-wide version of the OC-48 stream 20, a 77 MHz dual-edged clock 56, and the frame pulse outputs 58 of the 1:16 demultiplexer (DMUX) and Frame Detect block 39 (FIG. 2). The frame pulse signal 58 is of particular importance because most of the functional units of the SORCC 40 depend on some version of it for synchronization to the SONET frame structure.

The SONET standard specifies two sets of 48 bytes at the beginning of each frame, the A1 and A2 bytes, to serve as a framing pattern for all network elements to recognize. Any scheme for synchronization utilizing some subset of this 96-byte pattern for frame detection and meeting certain timing and probability requirements is acceptable. The SORCC 40 is designed to work with a frame detect system that recognizes three bytes around the A1A2 boundary (byte 48 is the last A1, byte 49 the first A2). Most frame detect circuits available on the open market use such a strategy. A single check of a three-byte sequence does not meet the assurance level against false frame recognition required by the standards, as will be developed later, so a mechanism of screening out invalid frame pulses is provided in the SORCC 40.

The frame pulse (FP) delay block 60 inserts a user-selectable delay of up to two clock periods, or cycles, in front of the incoming frame pulse 58, providing flexibility to the design of the frame detect block 39 (FIG. 2). Because of it, a frame pulse can arrive in any of four positions relative to the start of the A2 overhead bytes and still be properly aligned for the SORCC 40 to recognize. The 16:32 Demultiplexer (Demux) 62 reduces the data rate down from 77 Mb/s per line, referenced to both edges of the 77 MHz clock, to 39 Mb/s per line, referenced to only the falling edge of the 77 MHz clock. This makes it possible to realize the more complex logic of the rest of the chip in a design using available standard cells.

The frame control block 64 performs one function that affects the data path: it creates a new frame pulse aligned to the first word of each frame. This frame pulse is used by all following blocks in the SORCC 40, so any spurious frame pulses created by the frame detect circuit are screened out before they cause problems in the SORCC 40.

Figure 5:
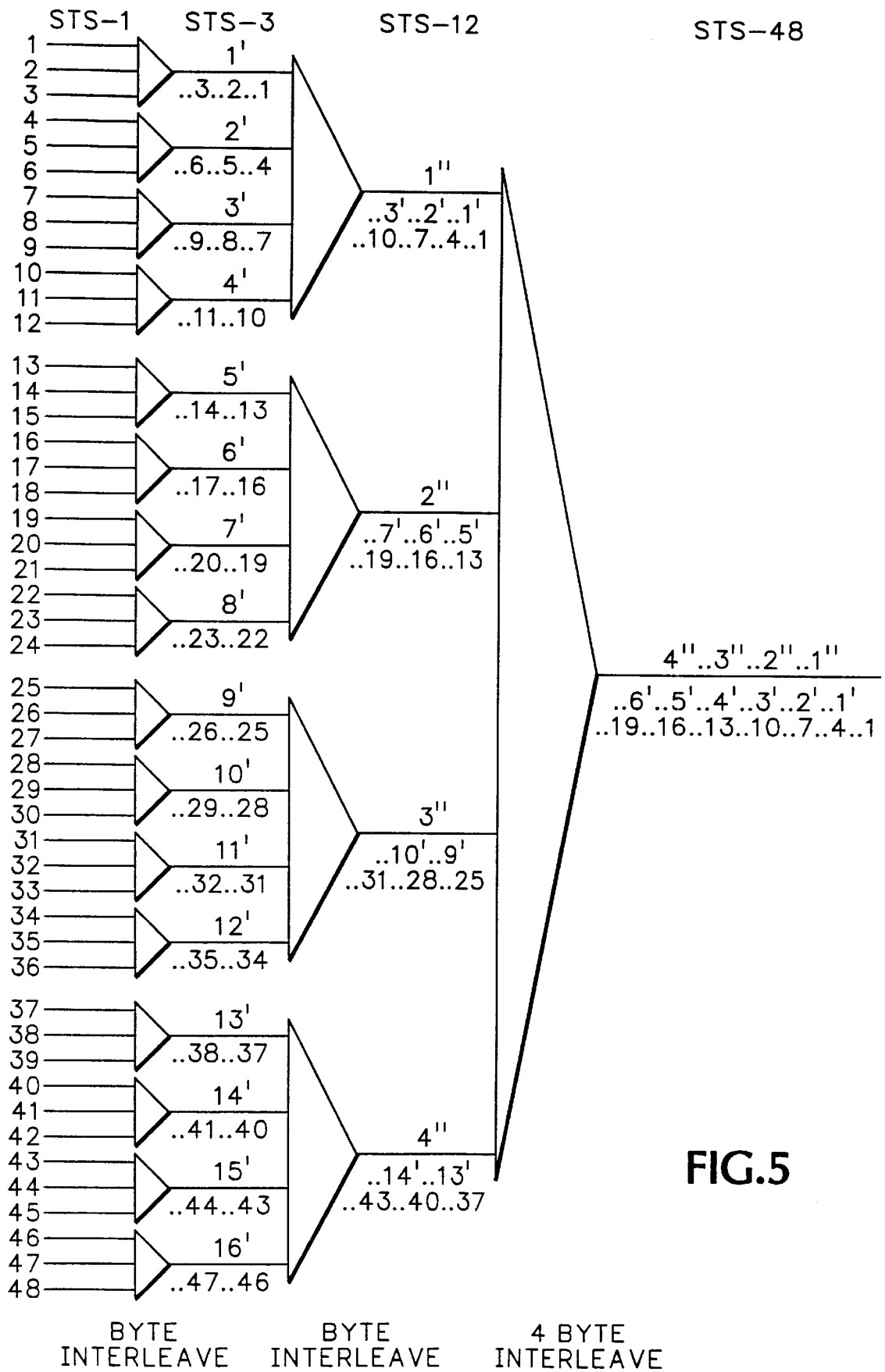
FIG. 5 is a diagram showing the interleaving relationships between STS-1, STS-3, STS-12, and STS-48 signals.
Figure 5A:
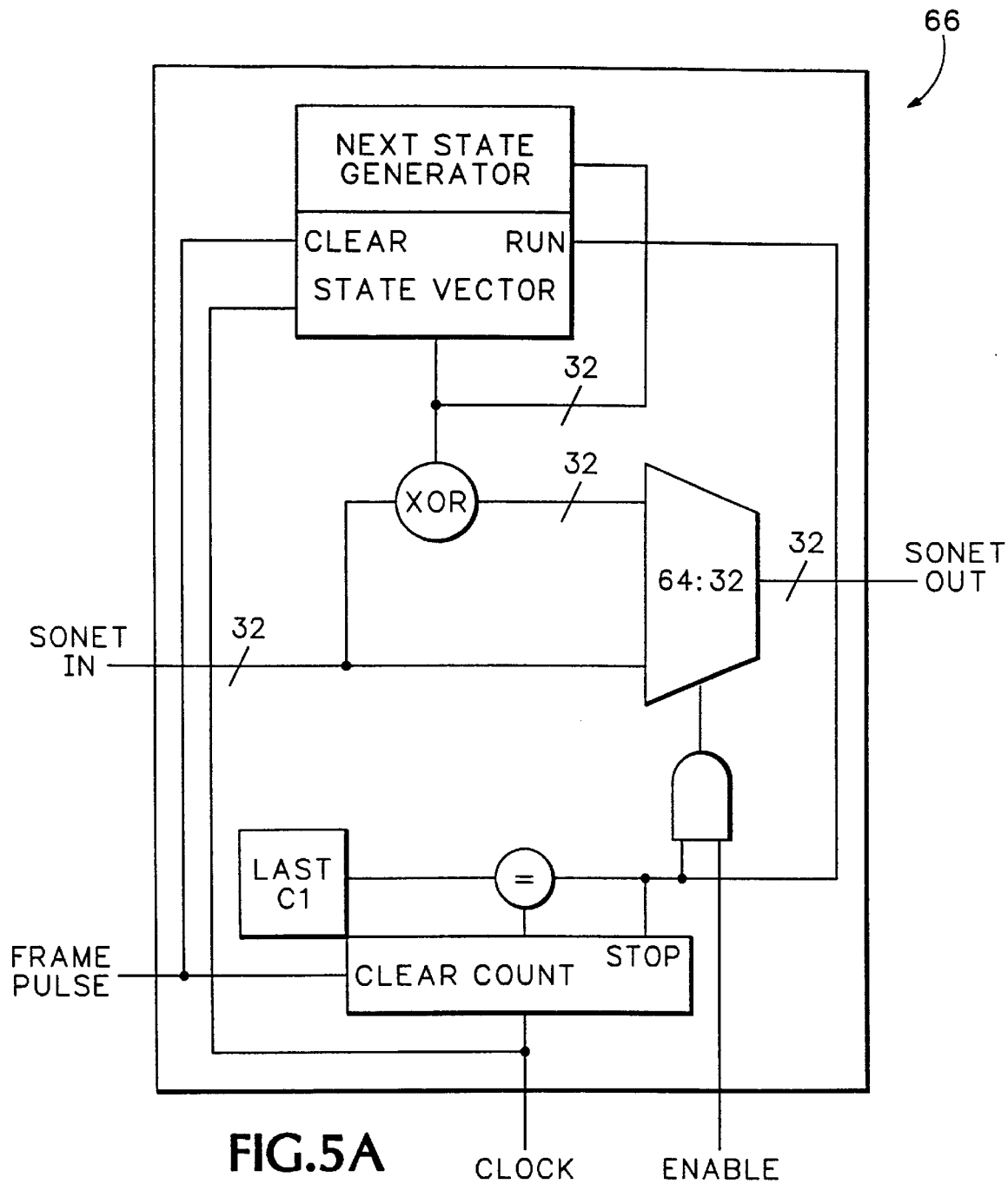
FIG. 5A is a logical block diagram of the descrambler shown in FIG. 4.

Referring now to FIG. 5A, the descrambler block 66 is a 32-bit-wide implementation of the shift-register frame synchronous scrambler specified in the standards. SONET frames are scrambled with a pseudo-random sequence before transmission to ensure that, for virtually any payload, the data stream 20 contains enough transitions to permit clock recovery at the receiver. This scrambling covers all of the data in a frame except for the first row of overhead, that is, the A1, A2, and C1 bytes. The descrambler 66 performs the inverse operation on the same set. The descrambler 66 can be deactivated, allowing data to pass through unmodified. The descrambler 66 would probably only be turned off in a network element in order to perform system test functions.

Figure 6:
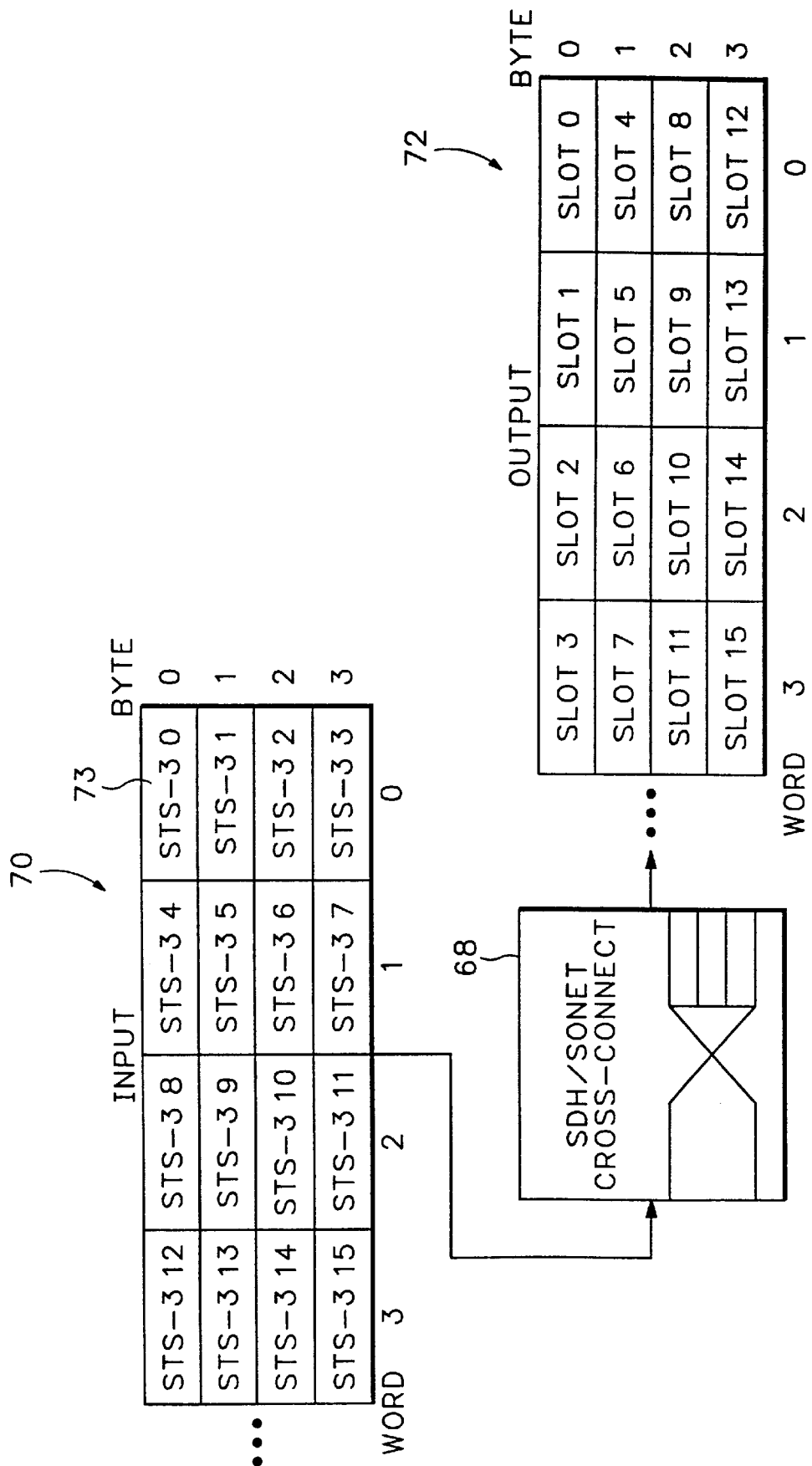
FIG. 6 is a block diagram showing the cross connect input and output slots of the receiver processor.

Referring to FIG. 6, the cross-connect 68 is a user-configurable block that allows reorganization of the OC-48 signal 20 at the STS-3 level. The cross-connect 68 defines sixteen output "slots" 72 and sixteen input "slots" 70, each slot being one byte wide, and provides a logical crossbar connection among them. The sixteen input slots 70 are filled by sets of four 32-bit words from the input STS-48 data stream 20.

By aligning the first 73 of these four words to the first word of the frame, the cross-connect 68 assures that the 16 bytes contained by the four consecutive words are in order from STS-3 #0 to STS-3 #15, so the input slots can be numbered according to the STS-3 that passes through them. Each of the 16 output slots 72 also occupies a fixed position within the output STS-48 stream. The data coming in on any of the input slots 70 can be sent out through any of the output slots 72, allowing any STS-3 from the incoming STS-48 to be put out through any (or any combination) of the STS-3 slots in the outgoing 2.488 Gb/s stream.

Providing the cross-connect function in general receivers and transmitters greatly simplifies the task of building of add-drop and general multiplexing network elements, since any desired channel from the SONET stream can be output in any position from the receiver and accepted in any position at the transmitter. For reference, the structure of an STS-48 signal in terms of lower-rate signals is shown in FIG. 5.

Figure 1:
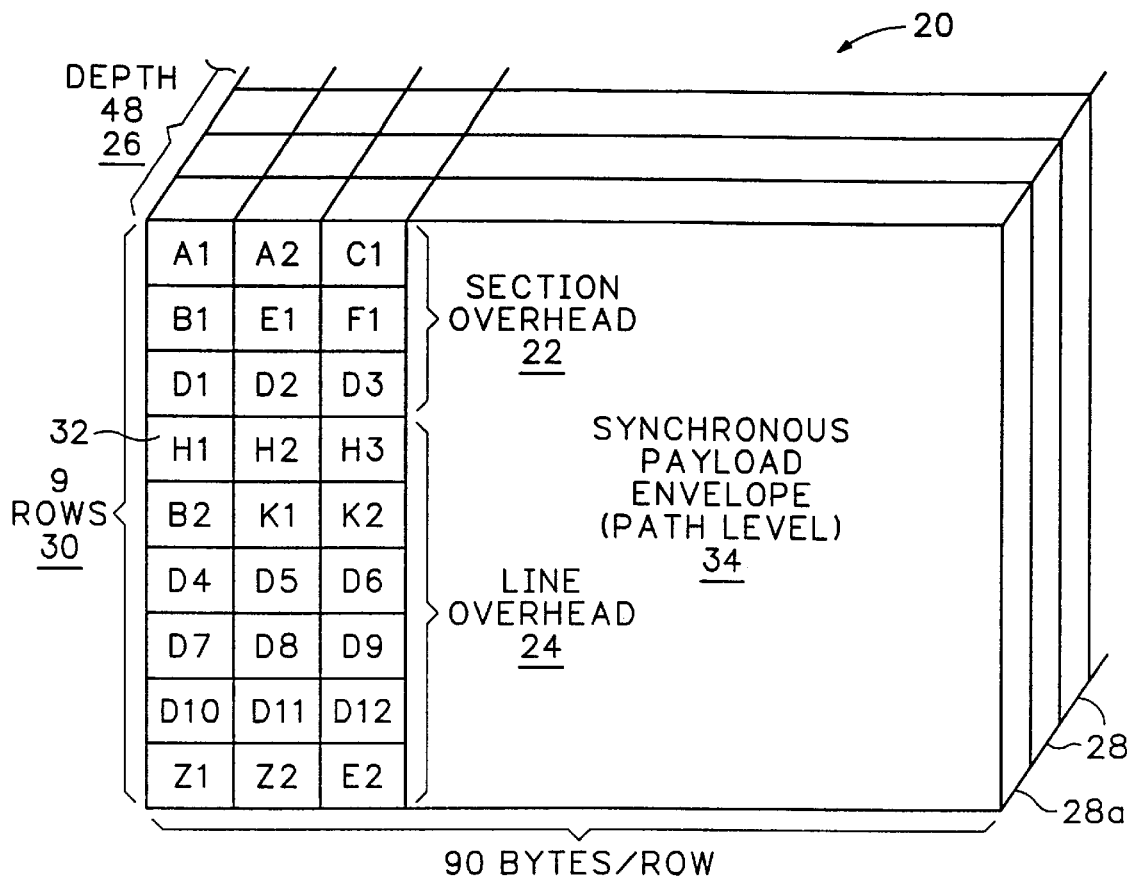
FIG. 1 is a graphical representation of the OC-48 frame structure and overhead.

Referring again to FIG. 4, the Line AIS block 80 selectively inserts an alarm indication signal (AIS) into the outgoing SONET data stream 82. The AIS is comprised of an all-ones pattern filling the entire frame except for the section overhead 22 (FIG. 1). The AIS may be inserted as a response to problems such as loss-of-frame (LOF) and loss-of-signal (LOS) to communicate to a path-terminating element that a failure has occurred. An external pin is used to activate this block so as to allow the host system to choose whether or not to overwrite the existing data stream in these error cases.

The scrambler block 84 is a set of four byte-wide frame-synchronous scramblers based on the same SONET scrambling polynomial as the descrambler 66. If the scrambler block 84 is enabled, it forces the chip's four output channels into the STS-12 format, though the SORCC does not perform some of the functions that guarantee recovery of legal STS-12s from an STS-48. The scrambler 84 is present in the SORCC 40 in order to create signals loosely suitable for direct serialization and retransmission from an OC-48 to OC-12 demultiplexer. In a general network element, the signal coming out of the SORCC 40 likely would be processed further before being retransmitted, so the scrambler 84 would be disabled.

In summary: on its trip through the data path of the SORCC 40, the STS-48 signal 20 is spread from a 16 bit wide 77 MHz signal to a 32 bit wide 39 MHz signal, realigned to the frame pulse, optionally descrambled, reorganized at the STS-3 level, possibly overwritten by an alarm indication signal, and optionally scrambled for output as four channels of STS-12. All of this processing must maintain a throughput of 2.488 Gb/s and as low a latency as possible.

Figure 7:
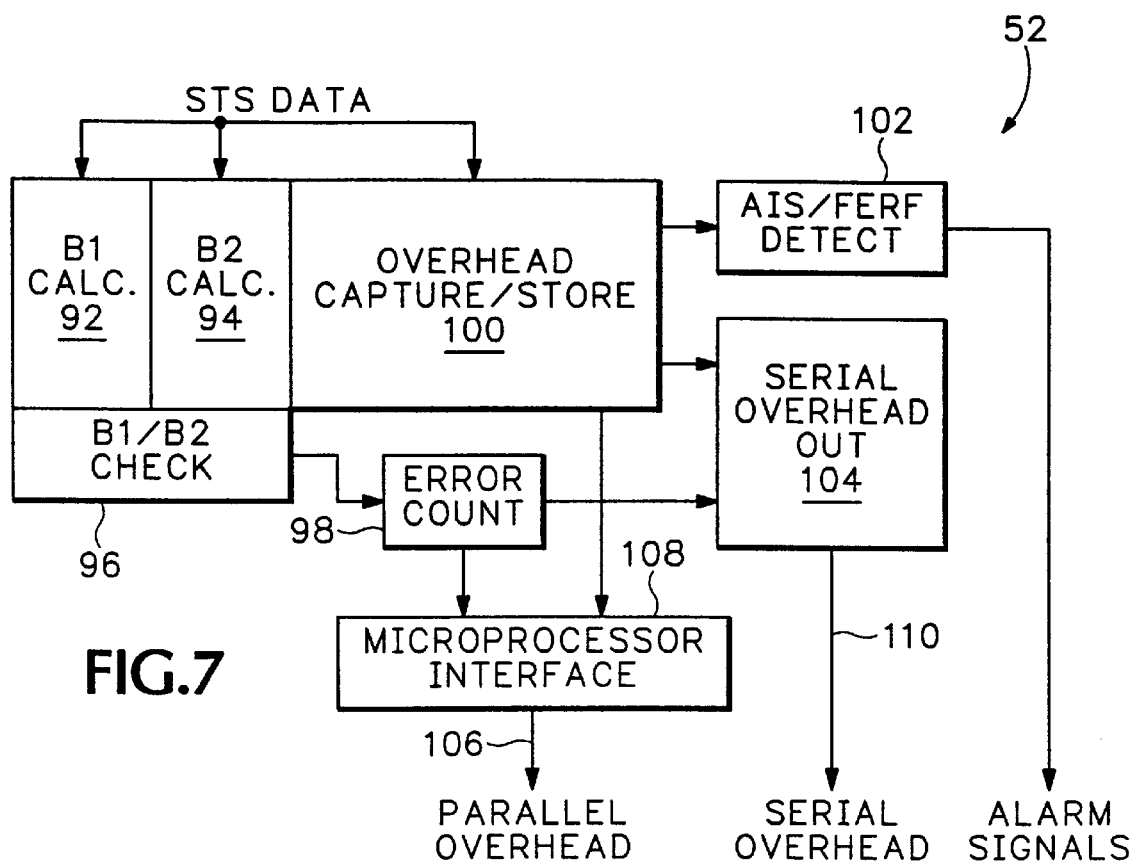
FIG. 7 is a block diagram of the overhead processing portion of the receiver processor.

FIG. 7 depicts the overhead processing subsystem 52 of the SORCC 40. Overhead functions fall into three categories: overhead-based error monitoring, overhead capture, and overhead presentation. Overhead-based error monitoring entails computing the B1 and B2 parity counts defined in the SONET standard, comparing them to the values sent from the transmitting end, and keeping a count of mismatches. Devoted to these functions are the B1 and B2 calculation blocks 92, 94, the B1/B2 check block 96, and the error count block 98.

The parity calculations required by the SONET standard yield a byte or set of bytes with bits such that a Boolean addition of any bit of the calculated value with all the bits in the same position within the covered data set yields a value of zero. As an example, the even parity byte corresponding to the bytes 01010101, 11001100, 00011000 would be 10000001. The B1 is a one byte parity calculation covering the entire frame's scrambled data. The B2 is a forty-eight byte parity calculation, where each byte covers one STS-1's data, excluding the section overhead, before that data has been scrambled. The B1 calculation block in the SORCC 40 looks at the four-byte-wide data stream passing between the 16:32 demux 62 and the descrambler 66, and computes a byte that yields even parity over all the bytes of one frame of that stream. While it is computing the byte for one frame, it makes its calculation for the previous frame available to the B1/B2 check block 96. The B2 calculation block 94 looks at the data passing between the descrambler 66 and the cross-connect 68 and computes 48 bytes that yield even parity over all bytes not belonging to the section overhead 22 of each frame. As in the case of the B1 calculation, the last frame's parity words are made available for checking as the current frame's parity is accumulated.

The B1/B2 check block 96 compares the data sent in each frame's B1 and B2 overhead bytes with the parity bytes calculated by the B1 and B2 calculation blocks 92, 94 during the previous frame. It sources a count of the number of bits that do not match, and a line that indicates whether the count is of B1 or B2 errors. The count output of the B1/B2 block 96 is forced to zero when the SORCC 40 has not yet detected the frame structure, to avoid accumulating a false error count. The error count block 98 accumulates the count sourced by the B1/B2 check block 96 during each frame and updates its internal error counters on each frame pulse. There are three counts available from this block: accumulated B1 errors, accumulated B2 errors, and errored frames. The errored frame count is incremented by one for each frame in which one or more B1 or B2 errors are detected. All three counters can accumulate at least one second's worth of errors without overflow. The internal counters can be latched into a user-readable space and cleared through the control interface.

The overhead capture/store block 100 performs all of the overhead capture functions of the SORCC 40. Every frame, it captures the following overhead bytes: the first 16 C1s, which are under study for use in a section trace function; the synchronization status, also under study; the section and line data communication and orderwire channels; the section user channel; the automatic protection switching (APS) channel; and the far end bit error (FEBE) byte. These bytes are defined in the standard. Also, in recognition of the fact that many networks may use some of the undefined of the overhead bytes to establish application-specific channels, and that the standards themselves are still in flux, 24 user-selectable bytes are captured from each frame. These bytes can come from anywhere within the frame, whether overhead or payload.

As well as capturing overhead data, the overhead capture block 100 performs the filtering of the APS channel required by the standards. It keeps separate APS values that are only updated when the same value is captured in the K1 or K2 byte for 3 or 5 consecutive frames, as selected by the system. The alarm indication signal/far end receive failure (AIS/FERF) detect block 102 sources alarm signals based on this filtered value.

All of the error monitoring and capture functions exist to recover administrative information from the STS-48 without interfering with its further transmission. The serial overhead output 104, the parallel overhead output section 106 of the microprocessor interface 108, and the AIS/FERF detect blocks 102 serve to provide access to this information. The serial overhead output block 104 provides dedicated output pins for the defined serial channels: the section and line orderwire and data communication channels and the user channel. It also outputs in serial form single-frame B1 and B2 error counts for use by the network element's transmitter side to build a FEBE count, and a serial stream of the 24 user-selectable capture bytes for application-specific uses.

During each frame, these serial lines 110 output the data stored or computed during the previous frame. The microprocessor interface block 108 represents the general control and data interface. Although much of the SORCC's memory is distributed, this conceptual block codifies the presentation of a parallel interface for all access functions. The captured overhead bytes and the accumulated error counts are available through it. The parallel interface also supports a "snapshot" option that allows the user to inhibit the normal frame-by-frame update of captured overhead, so the host system can take longer than one frame (125 $\mu$s) to survey the data, which could prove useful during system debugging and design. The snapshot option is also very useful in a test environment since it enables a system to analyze a portion of a signal at a later time.

This snapshot affects both the serial and parallel presentation of captured data. Finally, the AIS/FERF detect block 102 provides dedicated pins that indicate the presence of these alarm signals in the APS channel immediately, without processing by the external system. Together, these three interface blocks 102, 104, 108 provide considerable flexibility to the network element designer.

Figure 8:
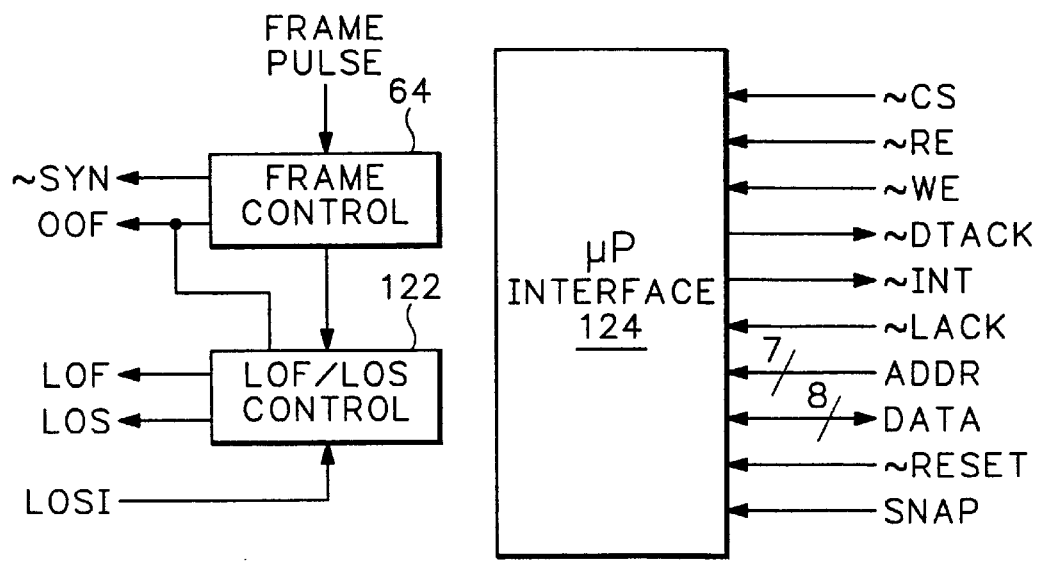
FIG. 8 is a block diagram of the control portion of the receiver processor.

The blocks that define the two-way SORCC-to-system interface are those of the control system 54. They serve to keep the SORCC 40 synchronized to the rest of the system and support interactive communication with other devices. These are the frame control 64, LOF/LOS control 122, and microprocessor interface blocks 124, shown in FIG. 8. The frame control and LOF/LOS control blocks 64, 122 serve to determine frame and signal related states as described in the standards, while the microprocessor interface 124 works mostly to support features associated with exchanging information with the host network element.

The frame control block 64 implements a state machine that uses input frame pulses 58 and the system clock 56 to determine frame alignment as defined in the standards. As previously noted, it also sources internal frame pulses that are retimed to the first byte of each frame. It has two outputs: the OOF line, which indicates whether the system is operating in the out-of-frame (OOF) or in-frame (IF) state, and the synchronization line (~SYN), which is used to indicate to the 1:16 demultiplexer/frame detect system 39 (FIG. 2) that synchronization has been lost and half-word realignment should be performed on the next detected framing pattern. The 16:32 demux block 62 (FIG. 4) inside the SORCC 40 performs word realignment based on this signal as well. These realignments are accomplished by recognizing that the first A2 byte should be the first byte of a half-word, and the fifth A2A2 half-word should be the first half of a full word. On the first A1A2 boundary detected after a falling edge of the ~SYN signal, the frame detect circuitry must realign its 16-bit output half-word so as to put the A2 in the high byte, and source a frame pulse synchronized to the new frame structure. Because of the action of the frame pulse delay block, that pulse always reaches the 16:32 demux block 62 aligned with the fifth A2A2 half-word, so the 16:32 demux puts the half-word arriving along with the first detected frame pulse after a falling edge on the ~SYN signal at the top of a word. At all other times, word alignment must be held constant regardless of incoming framing patterns, since only the frame control block 64 has enough information to judge those patterns valid or spurious.

Figure 8A:
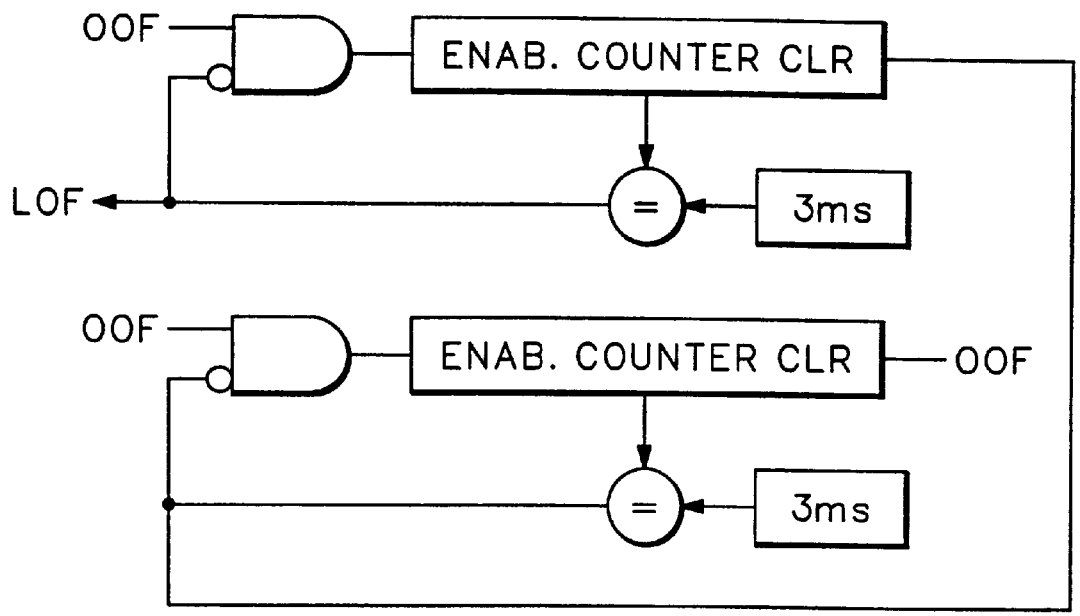
FIG. 8A is a logical block diagram of the Loss-of-Frame portion of the control portion shown in FIG. 8.

The loss-of-frame/loss-of-signal (LOF/LOS) control block 122 performs additional synchronization status monitoring as dictated by the standards. Referring to FIG. 8A which shows the LOF frame portion of control block 122, the loss-of-frame state will be entered if the SORCC 40 remains in the out-of-frame state (OOF line high) for 3 ms without staying in-frame (OOF line low) for 3 ms continuously. That state will remain active until the SORCC 40 stays in-frame for three continuous milliseconds. While in the loss-of-frame state, the LOF line will be asserted high. Preferably, the LOF/LOS control block 122 implements the integrating timer described in the Bellcore SONET specification.

Figure 8B:
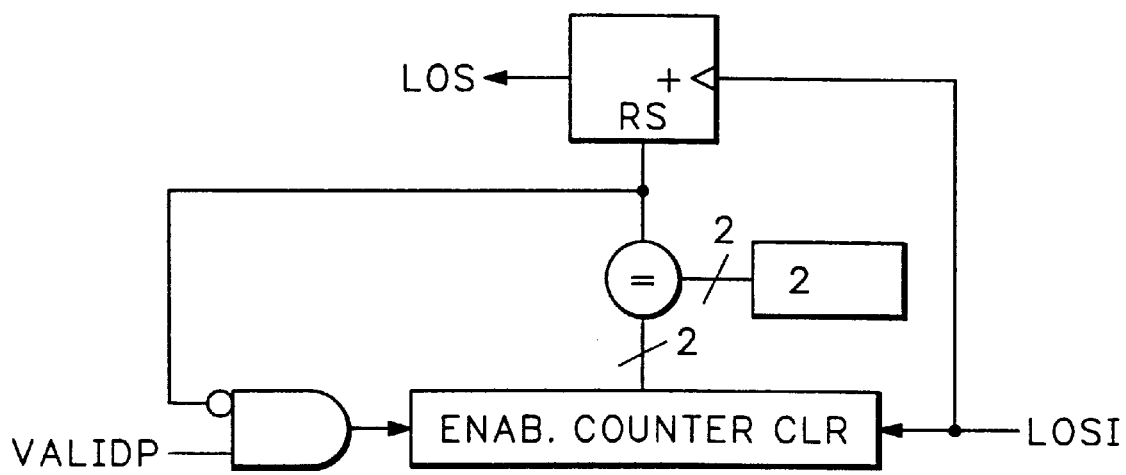
FIG. 8B is a logical block diagram of the Loss-of-Signal portion of the control portion shown in FIG. 8.

Referring now to FIG. 8B, the loss-of-signal state will be entered when the LOSI input line is asserted, indicating that upstream electronics have not seen an electrical transition in more than 2.3 $\mu$s. The SORCC 40 will remain in that state until two frame pulses judged valid by the frame control block have been received. The LOS output line indicates the presence or absence of the loss-of-signal state.

The microprocessor interface 124 performs five key functions. First, it houses the master control register which contains "switches" that control the operation of several other blocks. Second, it monitors several status signals and provides the option of sourcing microprocessor interrupts based on them. Third, it implements the snapshot decision circuitry that controls the update of the overhead capture block. Fourth, it generates the data acknowledgment handshake signal associated with parallel register accesses in some microprocessors and microcontrollers. Finally, it bears responsibility for the specification of the parallel interface strategy that connects the visible register space of the SORCC 40 to the host system.

Figure 9:
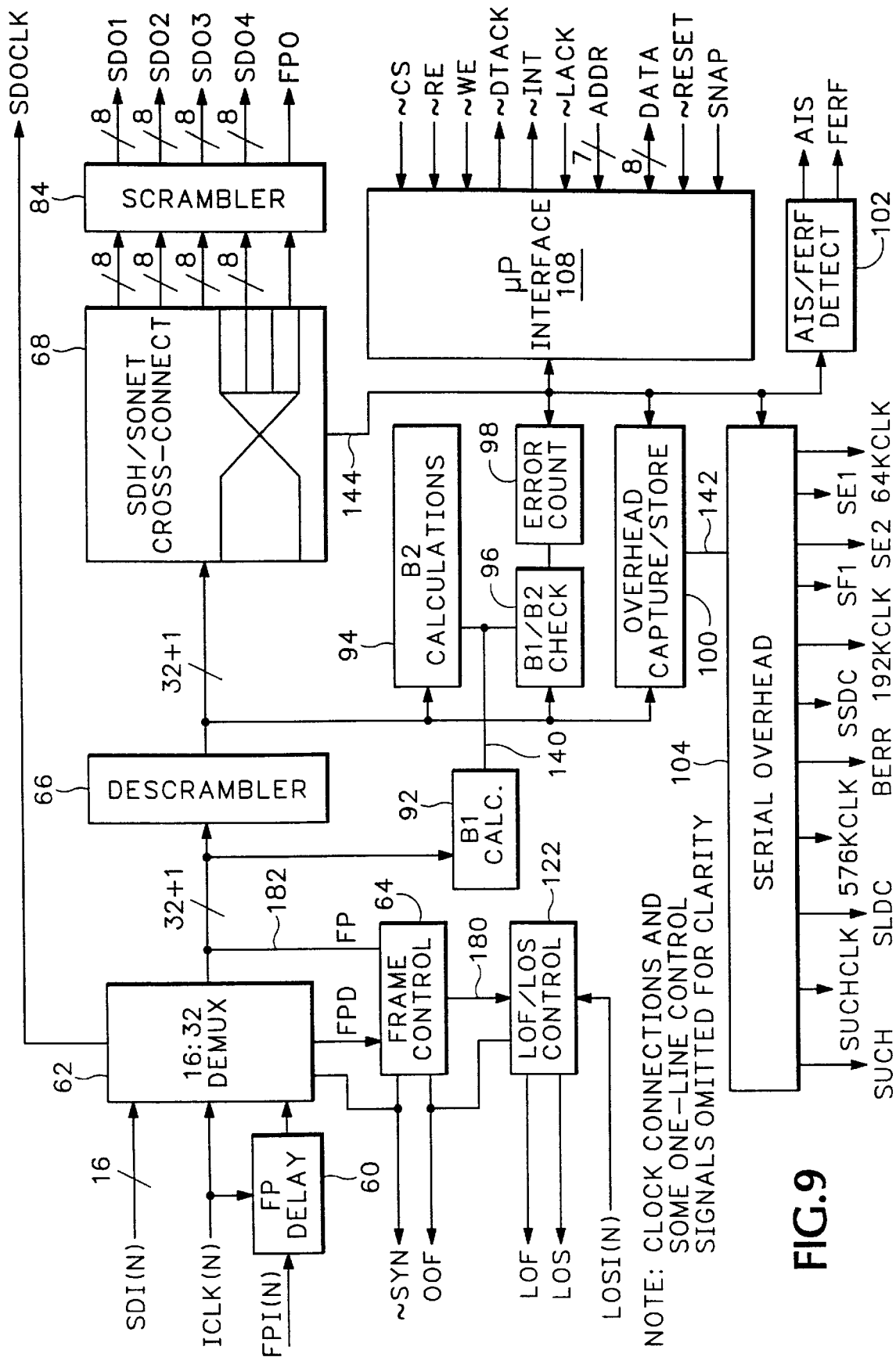
FIG. 9 is a block diagram of the receiver processor showing the elements of FIGS. 4, 7, and 8.

FIG. 9 shows how the blocks of these three major subsystems come together to form the complete SORCC processor 40.

Communication between the SORCC 40 and the host system is strictly specified by its input/output pins, and its seven-bit address space. Communication among the functional units within the SORCC 40 also needs to be clearly defined to maintain the level of abstraction represented by the block diagram of FIG. 9.

The data path blocks can be viewed as a set of functions that operate in series on the data path. As such they communicate only through their input and output variables, the SONET stream and the frame pulse. No one block has access to the internal state of another.

The blocks of the overhead path, on the other hand, act to monitor and interpret the SONET stream, and thus need other communication paths, as well as a listening path to the stream itself. These connections are evident in FIG. 7. The AIS/FERF block 102 has direct access to the filtered K2 value inside the overhead capture and storage block 100 to allow it to perform its interpretive role. The error count accumulators 98 are connected directly to the six-bit error count sourced by the B1/B2 check block 96.

There are also three more complex communication paths among blocks: the parity error check bus 140, the serial data interface bus 142, and the parallel system bus 144. The parity error check bus 140 is a unidirectional communication link that transfers words of data from the parity calculation blocks to the B1/B2 check block 96. The check block 96 is the dedicated master; it uses five address lines to specify which calculated parity value should be put on the 32 bit data bus. The responsibility for recognizing whether all or part of that data word is valid falls on the master.

The serial data interface bus 142 is also unidirectional; it carries bytes of data from the overhead storage block and the error count block to the serial overhead output block. Again the recipient of the data is bus master, using a 6-bit address to call out the appropriate byte of data.

The most complex link is the bidirectional parallel system bus 144, since it requires both a read and a write strategy. This bus provides access to control functions, configuration options, error counts, and captured data within the SORCC 40 from the host system. The responsibility for codifying its access strategy belongs to the microprocessor interface 108, which sits symbolically between the host system and those internal blocks accessible in the SORCC address space. The interface strategy chosen is similar to that of standard RAM and ROM chips, and supports both popular microprocessor access protocols.

The blocks of the control path 54 require only point-to-point communication links. The microprocessor interface 108 sends out control signals to several blocks, and the frame control block 64 informs the LOS/LOF block 122 whenever it detects a valid frame pulse or goes out of frame. All other control communications pass through the parallel system bus 144.

The modularity provided by defined communication paths inside the IC ensures that changes made inside one block will be invisible to others. The individual modules were designed using a hardware description language that compiles to a netlist of standard cells in a CMOS library. Where circuit diagrams are presented here, they were extracted from these netlists, not used to create them, so they show points of interest within the circuitry of a block rather than the entire block's schematic. All functional units of the SORCC 40 were simulated individually using a digital simulator with estimated parasitic capacitance values and shown to function as required. Whole-IC simulations have verified that they work together properly.

The following sections will present the design of each block, working from top to bottom, left to right through the diagram of FIG. 9.

Figure 10:
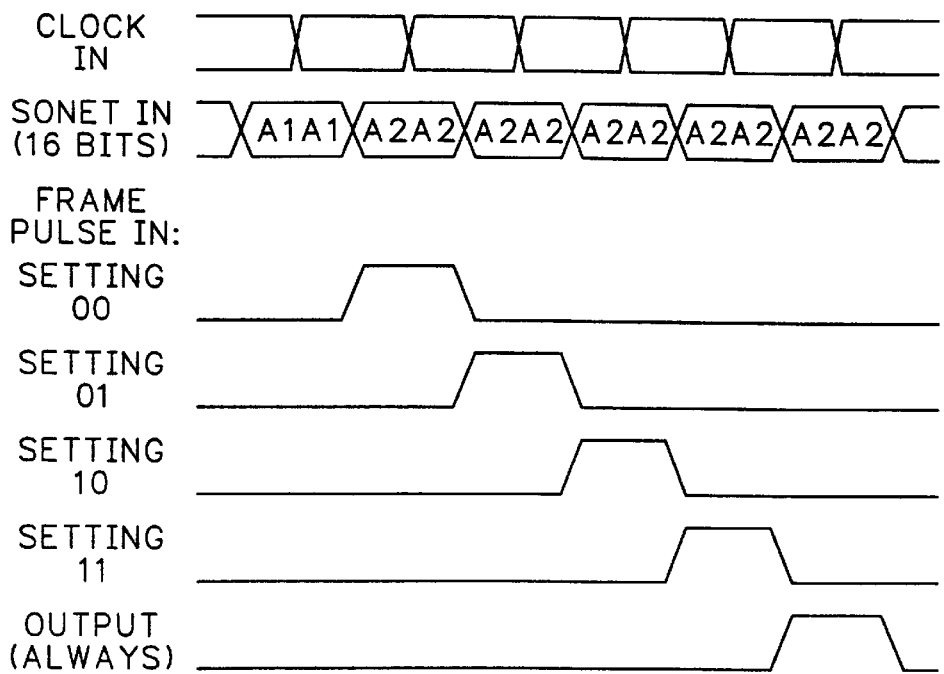
FIG. 10 is a signal diagram showing the frame pulse delay function.

The frame pulse delay block 60 decodes its setting from two dedicated control lines from the microprocessor interface 108. Based on that setting, it inserts the proper delay into the frame pulse channel to align its output pulse with the fifth 16-bit A2A2 word. To accomplish this, the block uses flip-flops to sample the frame pulse input (FPI) line on every clock edge and keep a history one full cycle deep. The decoded setting determines which of these four samples drives the output, synchronized combinatorially to the proper clock edge. FIG. 10 depicts this function.

Figure 11:
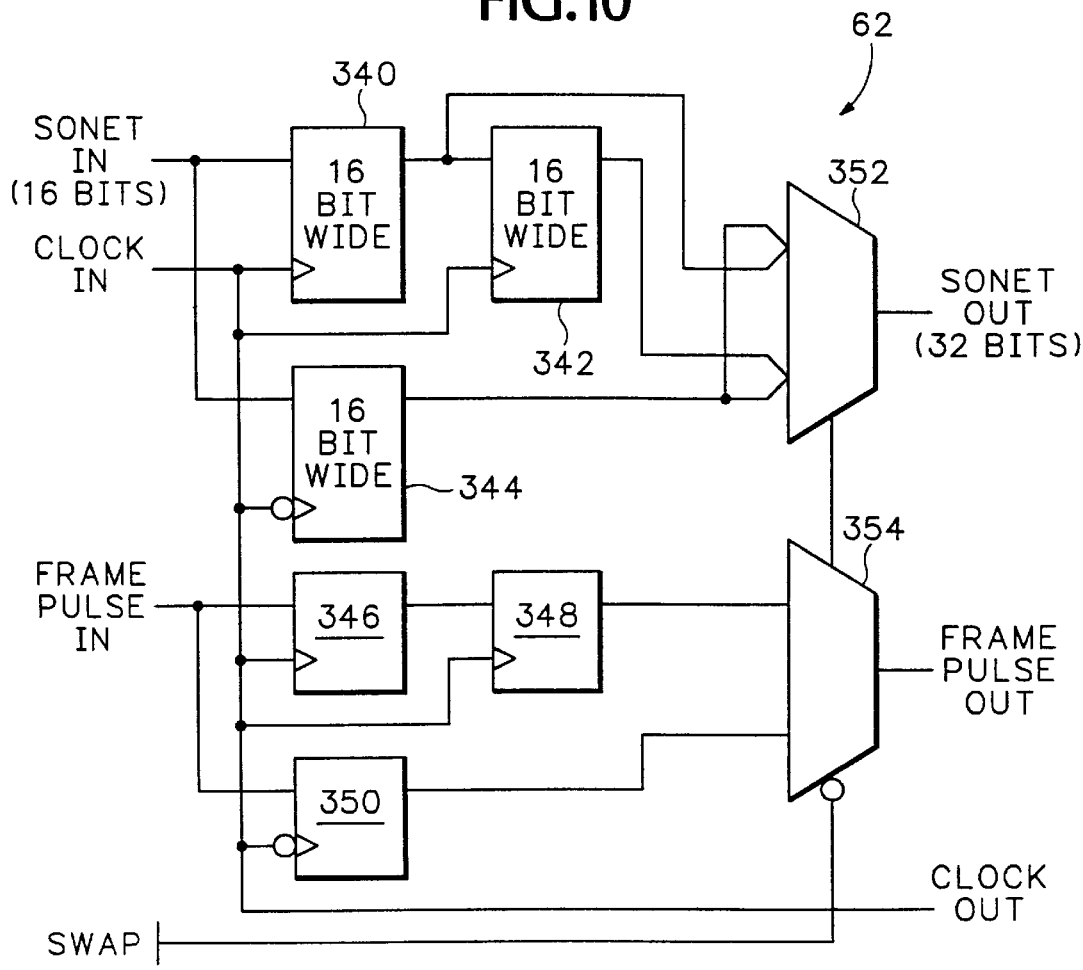
FIG. 11 is a block diagram showing the samplers and selectors of the 16:32 demultiplexer of the receiver processor.

Referring now to FIG. 11, the 16:32 Demux block 62 is composed of three 16-bit registers 340, 342, 344 that provide three samples of the incoming data: a rising edge, a once-delayed rising edge, and a falling edge. Likewise, three one-bit registers 346, 348, 350 provide three samples of the incoming frame pulse line. The internally-generated swap signal controls one-of-two selectors 352, 354 that determine how the output signals will be configured. If the swap signal is high, the upper half-word of the 32-bit STS output is composed of the falling edge data sample, and the lower half-word is the rising edge sample. In this case, the output frame pulse line is driven by the falling edge frame pulse sample. If the swap signal is low, the delayed rising edge data sample drives the top bits of the data output, and the falling edge sample drives the low. Now the frame pulse output is generated from the delayed rising edge frame pulse sample. The swap signal is generated when the block detects the first frame pulse after the ~SYN pin has gone low (requesting byte realignment). After that, the swap signal is held constant until another falling edge of SYN occurs.

Thanks to the FP Delay block 60, the frame pulse is guaranteed to arrive aligned to the fifth A2A2 word. That 16 bit half-word should become the high half-word of the third A2A2A2A2 word inside the SORCC 40. Therefore, if the frame pulse is detected on a rising edge, swap should be set low to put a rising edge sample in the high bits of the data word, and subsequent frame pulses must also come on rising edges. Otherwise, swap should be set high to put the falling edge sample in the upper half-word and future frame pulses should come from falling edge samples. Since all other SORCC blocks sample data on only the falling edge of the 77 MHz clock, the delayed sample is required on the rising edge.

Figure 12:
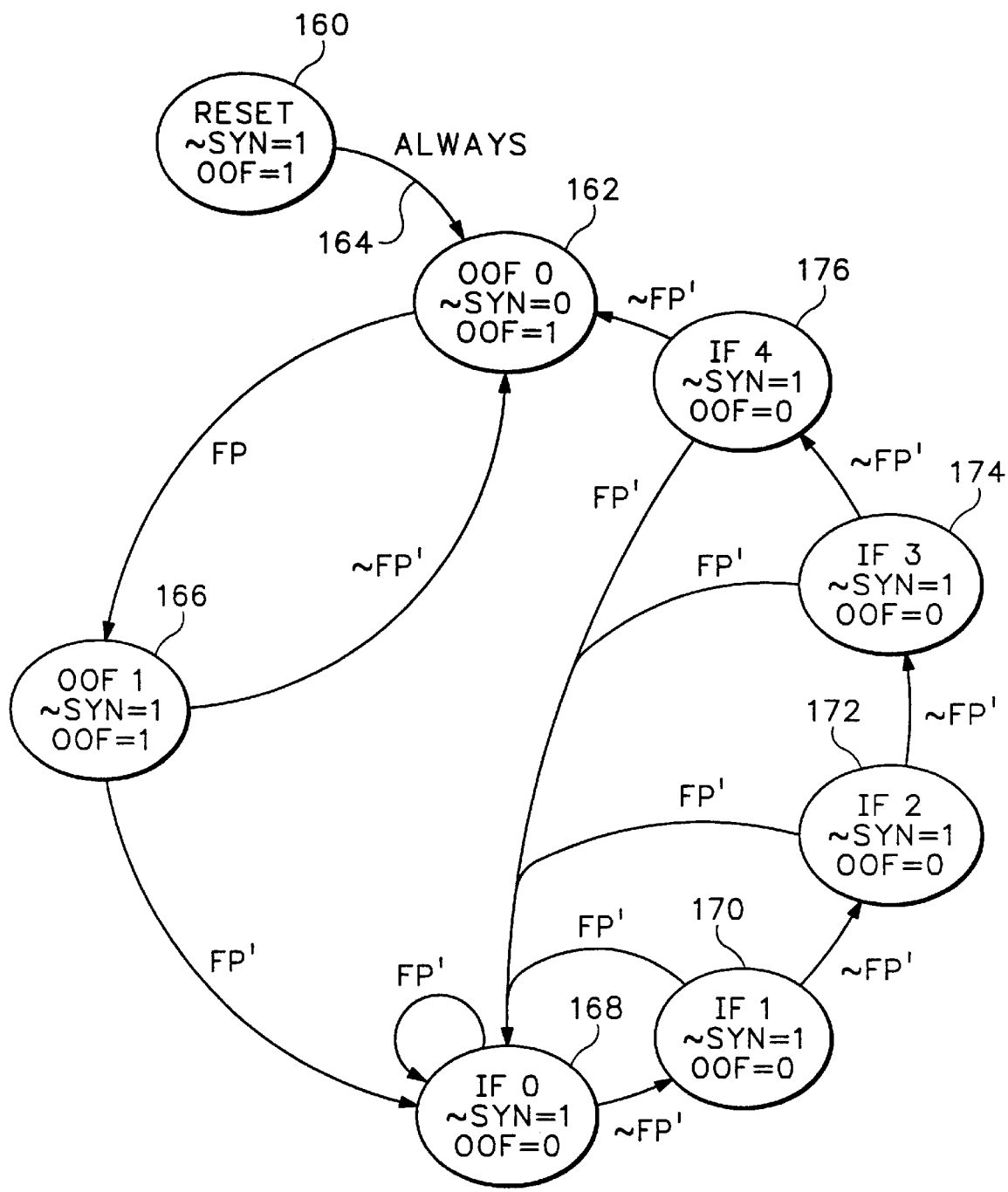
FIG. 12 is a state diagram of the frame control state machine.

The frame control block 64 implements a state machine that determines in-frame and out-of-frame conditions in compliance with SDH and SONET standards. The states and transitions of this machine are shown in FIG. 12. The notation presented there will be used in the description to follow. All state transitions are synchronized to the falling edge of the system clock, and output lines do not directly reflect the state variables.

The decision conditions are as follows. On reset, the state machine is forced into the Reset state 160, which it exits on the next clock edge into the lowest out-of-frame state (OOF 0) 162. This transition 164 is accompanied by a falling edge on the ~SYN line, communicating to the 16:32 demux block 62 and the external 1:16 demux system 39 that word realignment is appropriate. As soon as a frame pulse is detected, the machine moves to the second OOF state (OOF 1) 166, raises the ~SYN line, and begins counting words toward the next frame. When the count reaches 9720, the number of 32 bit words in a frame, the next frame pulse should arrive if the first was really valid. If a frame pulse is detected at this time (condition FP'), the state machine moves into the first in-frame state (IF 0) 168 and deasserts the OOF line. At this point the SORCC 40 is considered to be in the in-frame state. If instead the proper time comes but no frame pulse is detected (condition ~FPI'), the state machine falls back into OOF 0 shown at 162, dropping the ~SYN line and beginning the frame detection process anew. Once the in-frame state has been reached, several frame pulses in a row must fail to appear on time before the SORCC 40 will reenter the out-of-frame state and restart the frame synchronization process, so there are several states 170–176 leading from IF 0 (shown as 168) back to OOF 0 (shown as 162).

The frame control block 64 exports some signals to other blocks based on its knowledge of the frame structure. The LOF/LOS control block 122 receives a signal 180 that indicates either the arrival of the first frame pulse in a new alignment (OOF 0→OOF 1) or the arrival of a frame pulse at the proper time (FP'). Thus the signal is asserted every time a frame pulse has been detected and deemed valid, and can be used to meet the requirements for LOS state declaration. The frame control block 64 also exports the SORCC internal frame pulse 182, aligned to the first A1A1A1A1 word of each frame. It creates this pulse from the counter it uses to determine when to expect the next input frame pulse. Since it is known that input pulses arrive aligned with the third A2A2A2A2 word, a pulse generated 14 words before an input frame pulse's arrival should be aligned to the first word of the frame. This retiming of the frame pulse prevents any improperly timed frame pulses appearing at the SORCC input from propagating through the entire system. The frame control block 64 generates its first output frame pulse 182 over 9000 clock cycles after detecting the first input pulse, so for IC test purposes its filtering action can be disabled by setting a bit in a register of the microprocessor interface 108. This causes all incoming frame pulses to be declared valid and passed immediately to the output of the block 64.

The standards are quite specific in their description of the behavior of the framing circuitry, specifying the required probabilities for false framing and improper loss of frame. The characteristics of this frame control system will be derived below. As previously mentioned, the first requirement of the standards is that some subset of the A1 and A2 overhead bytes be used to detect incoming frames. In this receiver, the choice of a subset is the responsibility of the frame detect subsystem, but since most currently available options use the bytes 'A1A2A2' for this purpose, the SORCC 40 is designed to work with a 24 bit pattern.

The LOF/LOS control block 122 tracks Loss-of-Frame and Loss-of-Signal conditions independently. The LOS circuitry uses a rising-edge flip-flop to declare loss-of-Signal by asserting the LOS pin as soon as the LOSI input signal is asserted. The clock recovery or frame detection subsystem is responsible for asserting that signal whenever an absence of transitions in the SONET signal longer than 2.3 $\mu$s occurs. This is a reasonable partitioning of the task, because those systems must also perform other actions based on a lack of signal. The decision to exit the loss-of-signal state is made by the LOS part of the LOF/LOS control block. It uses a counter driven by the valid frame pulse line from the frame control block and reset by the LOSI line to detect the arrival of two valid frame pulses without intervening assertions of the LOSI line, a condition that corresponds to the specification for exiting the LOS state [15]. When that condition is met, the LOS flip-flop is reset, and the LOS line is deasserted.

The LOF control circuitry consists of three counters. A fast eight-bit parallel counter divides the 77 MHz input clock down to a 303 kHz clock. That clock then drives two 10-bit ripple counters, the OOF counter and the IF counter. The latter counter runs whenever the system is operating in the in-frame state, with the OOF line deasserted, and is reset whenever the system goes out of frame. The former runs whenever the chip is out of frame, and is reset when the IF counter reaches 912. If it reaches 911, the LOF line is asserted, and stays high until the IF counter reaches 912. The counter values 911 and 912 correspond to cycles of the 303 kHz clock, 3.00 ms in each case. The net effect of the interactions of these counters is an integrating timer which causes the LOF state to be entered if the SORCC accumulates 3 ms of time in the out-of-frame state without ever staying in-frame for 3 ms. It takes 3 ms of uninterrupted in-frame operation to then exit the LOF state. This meets the Bellcore specification for LOF.

The LOF block offers a selectable test configuration to simplify IC testing. In this configuration all three counters run off the system clock and are always enabled, and the LOF pin's value is set to the exclusive or of the 303 kHz clock and the LOF value computed from the OOF and IF counters. This results in a square-wave output with a base frequency of $1/256$th of the system clock, with a one-system-clock inversion every 1024 cycles, and allows the LOF circuitry to be tested in the course of 1000 test vectors rather than the 500000 or so it would take otherwise.

The descrambler 66 implements a parallel equivalent of the seven-bit shift register scrambler described in the standards. The parallel implementation was derived using the state vector methodology described in DooWhan Choi, "Parallel Scrambling Techniques For Digital Multiplexers," *AT&T Technical Journal*, Sep./Oct. 1986, Vol. 66, pp. 123–125. Using the state vector notation developed there, the SONET scrambler can be represented by the following transformation matrix and starting state:

$S^T(7) = [C0\ C1\ C2\ C3\ C4\ C5\ C6]$ (seven state bits)

$S_0^T(7) = [1\ 1\ 1\ 1\ 1\ 1\ 1]$ (start state defined as 1111111)

$S_{n+1}(7) = TR_7 S_n(7)$ $$TR_7 = \begin{bmatrix} 0 & 0 & 0 & 0 & 0 & 1 & 1 \\ 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \end{bmatrix}$$

To extend this scrambler to a 32-bit parallel implementation, it is first necessary to create an equivalent serial scrambler with a 32-term state vector. This is accomplished by adding 25 registers with no feedback to the end of the shift register chain shown in the standards. The new starting state is the first 32 bits generated by the original scrambler in operation. A new transformation matrix can be derived for this scrambler; it is a 32×32 matrix in which the first seven lines are the same as $TR_7$ above, filled to the right with zeros, and the next 25 lines continue the diagonal of 1s evident in $TR_7$. Call it $TR_{32}$. This matrix again represents a serial means of generating the scrambling sequence, where one state bit is applied to the input stream per cycle. To make the scrambler work in parallel, all 32 bits of the state vector must be applied at the same time, while the next 32 bits of state are computed. Those bits come from the state vector that would be $S_{n+32}(32)$ in the serial scrambler, so the proper transformation matrix must should yield that result for $SP_{n+1}(32)$. This matrix turns out to be $TR_{32}^{32}$:

$S_{n+32}(32) = TR_{32}(TR_{32}(\ldots S_n(32))) = TR_{32}^{32} S_n(32)$ $SP_n+1(^{32}) = TRP\ S_n(32)$, where:

$SP_{n+1}(32) = S_{n=}(32) \rightarrow TRP_{32} = TR_{32}^{32}$

A Boolean matrix exponentiation program was written to compute $TRP_{32}$, and other programs verified that the parallel and serial representations of the scrambler generated the same sequence. The starting state vector and transformation matrix implemented in the descrambler are as follows:

$S_0^T(32) = [1\ 0\ 0\ 0\ 1\ 0\ 1\ 0\ 0\ 0\ 0\ 1\ 1\ 0\ 0\ 0\ 0\ 0\ 1\ 0\ 0\ 0\ 0\ 0\ 1\ 1\ 1\ 1\ 1\ 1\ 1]$ $$TR_{32}^{32} = TRP_{32} = \begin{bmatrix}
0 & 0 & 1 & 1 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 0 & 1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 1 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 1 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 0 & 1 & 0 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 1 & 0 & 0 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 1 & 1 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 1 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 1 & 0 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 0 & 0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 1 & 1 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

The descrambler block 66 contains a 32 bit register that contains the current state vector. This register is asynchronously set to $S_0(32)$ on the first byte of the frame. Beginning in the cycle of the first SONET word after the C1 overhead bytes, the descrambler 66 computes a new state vector in every clock cycle. It realizes the Boolean matrix multiplication, $S_{n+1}(32)=TRP_{32}\ S_n(32)$, by defining the input to each bit of the state vector flip-flop as the result of an exclusive-or operation performed a set of its output bits. The required sets were extracted from $TRP_{32}$ by performing an exclusive-or for each "1" in a row:

$S_{n+1}(32)<0>=S_n(32)<2>$ xor $S_n(32)<3>$ xor $S_n(32)<4>$ xor $S_n(32)<6>$;

$S_{n+1}(32)<1>=S_n(32)<0>$ xor $S_n(32)<3>$ xor $S_n(32)<4>$ xor $S_n(32)<5>$ xor $S_n(32)<6>$.

When the descrambler block 66 is disabled, the state vector calculation still occurs, but the computed vector is not applied to the STS data. When it is enabled, the block output is the bitwise exclusive-or of its input and the state vector. Descrambling is automatically disabled during the A1, A2, and C1 overhead bytes, when the standards specify that no scrambling should occur. Since the state vector is always computed, the descrambling performed by this block will be properly synchronized even if enabled mid-frame.

The B1 calculation block 92 contains an eight-bit storage cell in which it computes the current frame's parity and another storage cell in which the computed parity from the last frame is stored. On the first word of each frame, the value in the calculation register is moved into the storage register, and the calculation register is set to the proper parity byte for the input word (Parity<7>=Input<31>xor Input<23>xor Input<15>xor Input<7>, etc.). On all other words, the new parity byte is the xor of the old parity byte with the parity byte that matches the current word (Parity<7>=Parity<7>xor Input<31>xor Input<23>xor Input<15>xor Input<7>, etc.). The parity storage byte is connected to tristate drivers that allow it to drive the parity error check bus when addressed by the B1/B2 Check block.

Figure 13:
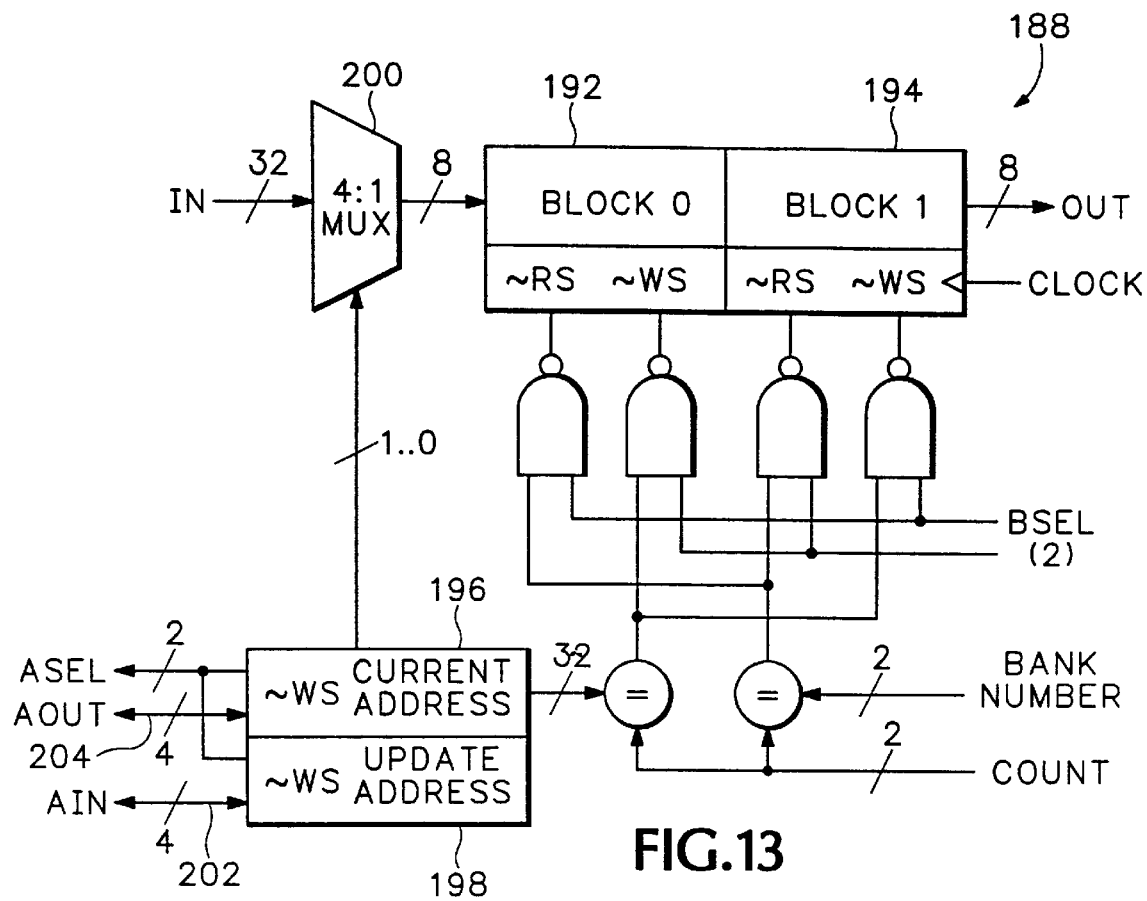
FIG. 13 is a block diagram of the cross connect switching element of the receiver processor.
Figure 14:
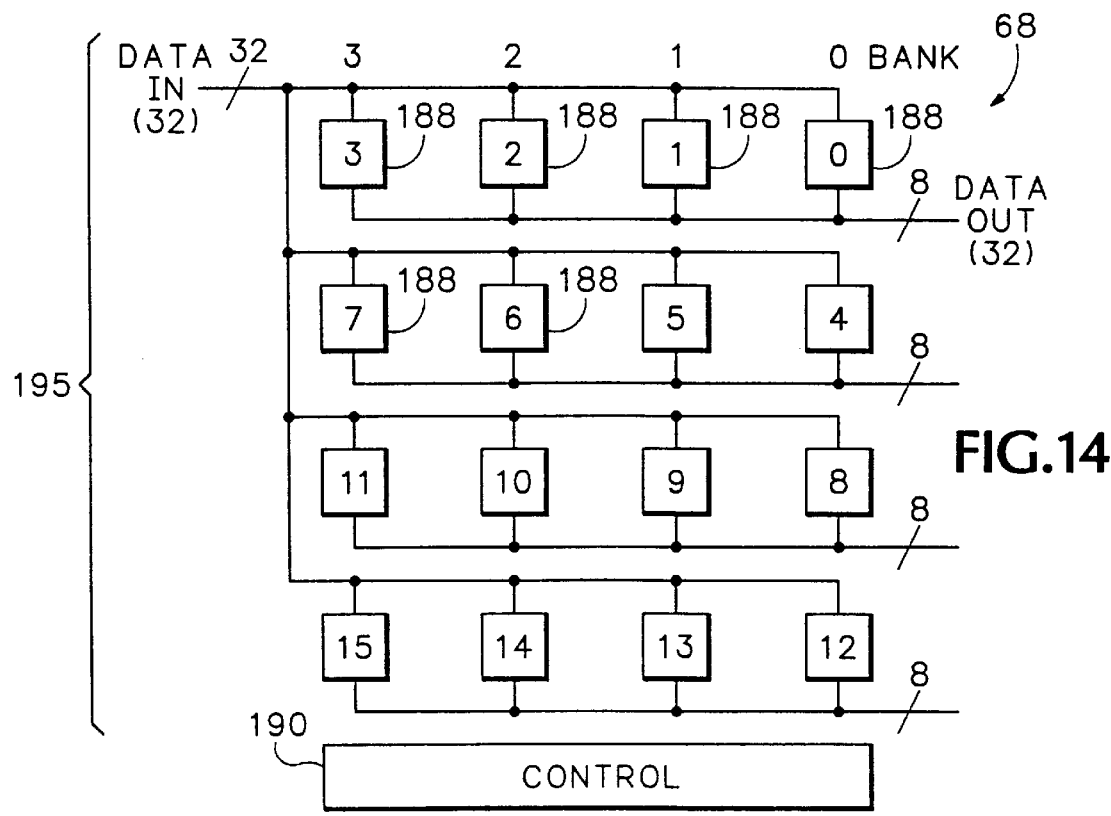
FIG. 14 is a block diagram of the cross connect switching matrix.

The cross-connect 68 is realized as a 4×4 matrix 195 of identical byte-wide storage/switching elements 188, synchronized by central control circuitry 190. Each of the switching elements 188 embodies one of the slots 70, 72 depicted in FIG. 6. The circuitry of single storage element 188 is presented in FIG. 13; the structure of the sixteen element switching matrix 194, in FIG. 14.

Each switching element 188 is made up of two one-byte blocks of data storage 192, 194, two four-bit address latches 196, 198, a 4:1 multiplexer 200, and some control logic. The two bytes of data space are connected in common to an input 202 and a tristate output bus 204. The element's control logic accepts a pair of block select (BSEL) lines, required to be logical opposites, that determine which block can be written into and which read from at any point in time. Each block element 192, 194 has a built in bank number which it compares to a two-bit word count provided by the central control logic to determine whether it belongs to the bank that should drive the output bus next. If so, one of its data storage blocks 192, 194 will receive a read enable signal (~rs) on the next clock. The word count (Count) is also compared to the high two bits of the element's user-defined address, to determine whether that address corresponds to a byte in the next word. If so, one of the data storage blocks 192, 194 will store data on the next clock. The low bits of the address drive the 4:1 multiplexer 200, selecting which byte of the 32-bit input word should be stored.

An element's user-defined address can be changed through a two-stage process. When the host system wants to reconfigure the cross-connect 188, it writes the new connection pattern of input STS-3s to output slots into the sixteen half-bytes of slot address space. The connection pattern is created by writing the number of an input STS-3, encoded as four bits, into the address location, half of an addressed byte, corresponding to the output slot it should be routed through. The cross-connect control logic decodes the slot space addresses and sends write select signals (Asel 1) to the appropriate storage elements. Each of the two slots written stores one of the two STS numbers from the parallel system data bus 144 in its "update address" latch (through the Ain lines). The cross connect control logic sets a flag when the last two slots are written at address 17, which causes it to source a transfer enable signal (Asel 2) during the A1 words of the next frame. At that point all 16 elements transfer the address stored in their "update address" latch to their "current address" latch. Since all STS-3s are guaranteed to have the same value during the A1 bytes, this reconfiguration occurs without any loss of data in the output stream.

The switching matrix 195 is organized in four banks of four storage elements 188. The control logic 190 supplies a 0 to 3 word count synchronized to the frame structure of the input STS-48 to all the elements. This count is used by each element 188 as previously described to determine whether it belongs to the set of cells that are expected to capture or drive data during the next cycle. On every fourth word the block select lines are inverted so that the data just stored can be read out, and new data can be written over what was just passed downstream. The control logic 190 is also responsible for inserting the proper 5 cycle delay in the internal frame pulse line, decoding the eight addresses that read and write configuration information to the 16 storage elements, generating the transfer enable after the last byte of configuration has been written, and controlling the set of multiplexers and tristate drivers that allow read back of the currently assigned addresses of the storage elements via their address out lines.

The data storage protocol that makes this matrix 195 of storage elements 188 act like a crossbar switch is distributed among them in the form of the built in bank number and the writeable address. The slots are created in the output stream by the rigid structure created by division of the matrix into rows, defined by the connection of elements to the output, and columns, defined by the bank numbers built into the elements. Synchronization to the SONET frame structure allows each element to store only bytes from the STS-3 it addresses. The division of storage into two blocks and the policy of reading from one block while writing to the other turns the combination of controllable storage and structured read back into a pass-through connection scheme. Since each element can store any byte of input data, this connection is nonblocking and best diagrammed as a crossbar.

The B2 calculation block 94 keeps its running parity count in twelve banks of word-wide registers. On each frame pulse, the 48 bytes of parity calculated in the previous frame are transferred from the calculation banks to storage banks. Since the B2 parity does not cover the section overhead, the parity calculation circuitry must be disabled during those words. This is accomplished by setting and clearing a calculation enable bit based on comparisons of constant values to the output of a counter synchronized to the STS-48 frame. Another counter determines which of the twelve banks should reflect the parity information of a given input word. Decoding logic interprets addresses sourced by the B1/B2 check block and drives the parity error check bus with the storage bank values as appropriate. Since each bit in the parity word only covers one bit in the input word, the parity calculation is simply the exclusive-or of one bit of the accumulated parity word with the same bit of the input word. The parity banks are all reset to zero during the first words of section overhead in each frame, so there is no need to select between methods of parity calculation as in the B1 calculation block.

Figure 15:
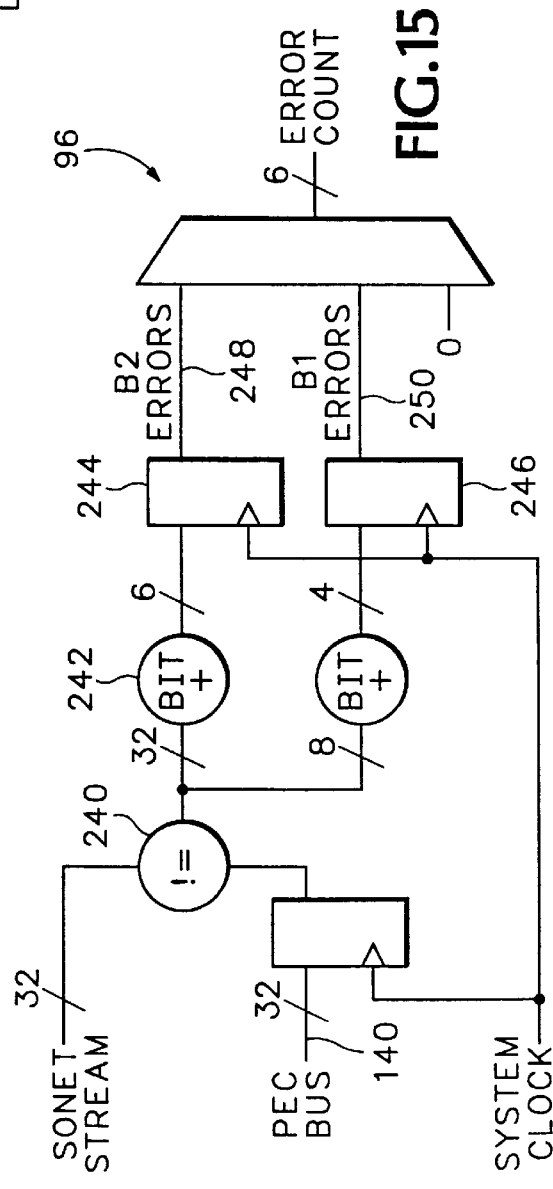
FIG. 15 is a logical block diagram of the B1/B2 check circuit.

The B1/B2 check block 96 uses a counter synchronized to the input frame structure to determine whether the B1 or one of the B2 bytes is about to appear in the SONET stream. Referring now to FIG. 15, one clock cycle before a given parity word (or partial parity word, in the case of the B1) is expected, the check block 96 drives the address corresponding to that word on the address lines of the parity error check bus 140. The B1 and B2 calculation blocks 92, 94 decode that address and drive the requested parity word. At the end of that cycle, the requested data is latched into the check pipeline. During the next cycle, a bank of 32 exclusive nors 240 compares the value that appears in the SONET stream to the latched parity word. Bits that do not match generate 1's in the 32-bit output of this comparison. A tree of adders 242 performs a bit addition operation on the comparison word to yield a 6-bit (0 to 32) count 248 of detected errors. The same operation is performed on just eight bits of the comparison word to yield a 4-bit (0 to 8) count 250 of detected errors in the first byte. Both error counts are latched by respective latches 244, 246 every cycle.

Further logic determines whether the parity value just checked was the B1 byte or one of the B2 words. If the former, only the 4-bit error count 250 applies; if the latter, the 6-bit count 248 is valid. Since a comparison is made in every cycle, there is also a third case, in which the word just checked was neither the B1 nor a B2. In this case neither error count has meaning, and an all-zero count should be used instead. The decision logic controls a one-of-three selector that switches a six-bit version of the appropriate count to the check block's output. The error count block 98 uses the top bit of the address on the parity error check bus 140 to determine which of its counters to increment, and adds the six-bit output 248 of the check block to that counter every cycle. To prevent the accumulation of spurious "error counts" when the SORCC 40 is in the out-of-frame state, the decision logic drives only zeros on the output when the OOF line is high.

The error count block 98 completes the parity error monitoring system. Depending on the value of the high bit of the parity error address bus, the block adds the value of the error count from the B1/B2 check block 96 to its internal one-frame B1 or B2 error counter. The values of these counters are added to the contents of the accumulation registers, copied to the serial output registers, and then cleared at the beginning of each frame. The errored frame accumulator is incremented if any error is detected during a frame. A write operation to the address of a user-visible error count register on the parallel system bus causes the value in the corresponding accumulation register to be latched into that space and then cleared. This protocol provides a stable value in the user-visible counter space while guaranteeing that no errors in the SONET stream go unreported. The error accumulation counters are big enough that they can not overflow if checked often enough: every second for the B1, every 5 seconds for the B2, and every 8 seconds for the errored frame count. The serial output registers are available for reading by the serial overhead output block 104 through the internal serial data bus 142.

Figure 16:
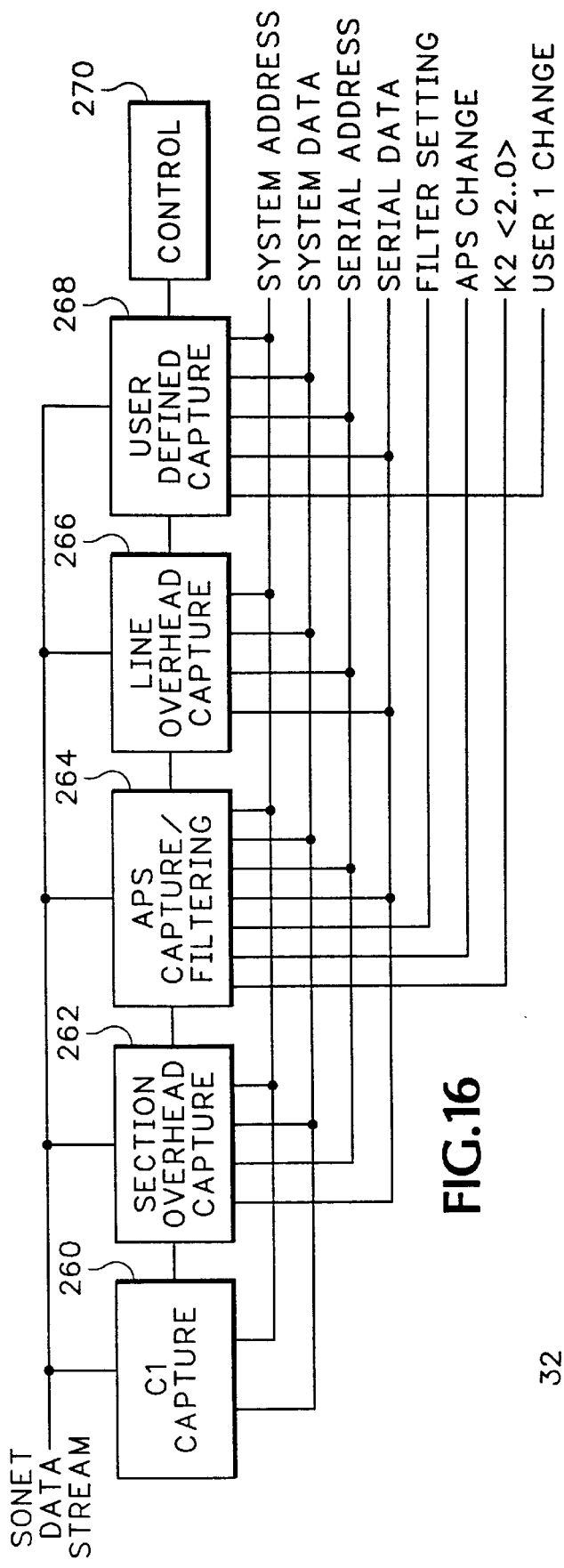
FIG. 16 is a block diagram showing the subdivisions of the overhead capture and storage block.

Referring now to FIG. 16, the overhead capture and storage block 100 is divided internally into five sections, all of which share some control signals. These sub-blocks are the C1 capture block 260, which captures the first 16 C1 bytes, the section overhead capture block 262, which captures the E1, F1, and D1–D3 bytes, the APS channel capture and filter block 264, which captures and filters the K1 and K2 byte values, the line overhead capture block 266, which captures the D4–D12, S1, M1, and E2 bytes, and the user-defined capture block 268. These divisions were introduced to provide a sensible distribution of loads on the parallel system bus address and data lines. FIG. 16 shows these sections and their major interface signals.

Each section 260–270 contains a set of capture cells where the actual overhead interception and storage takes place, some decoding logic to determine if one of its memory locations is being addressed on the serial data interface bus or parallel system bus, and some multiplexers and tristate drivers to respond if appropriate. All of the sections use one of two capture cell designs.

Figure 17:
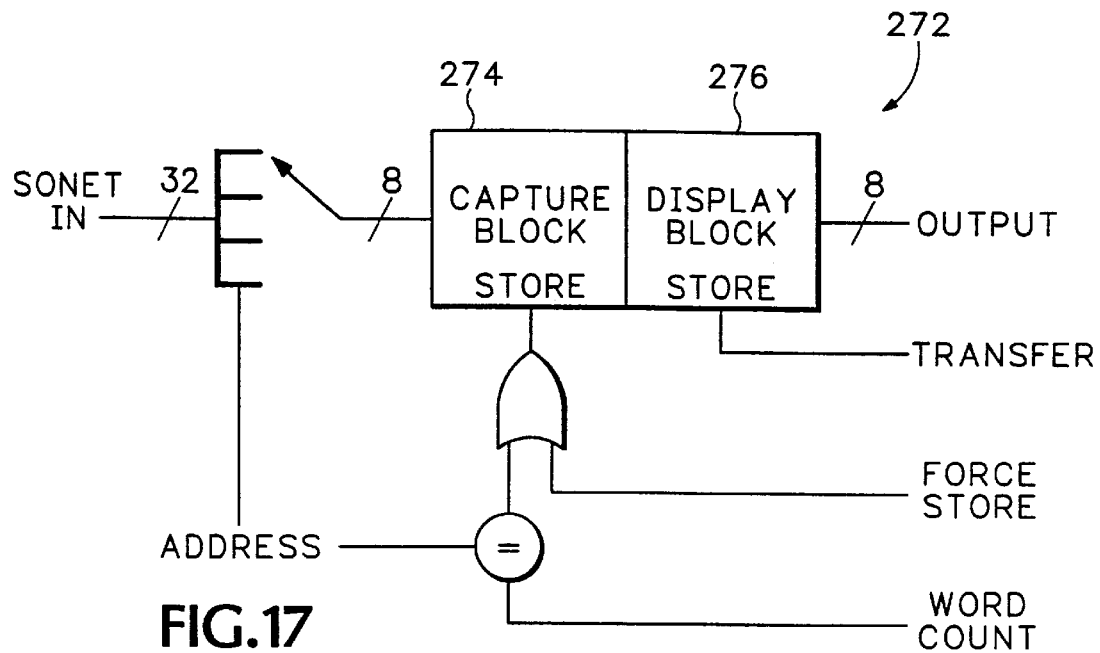
FIG. 17 is a logical block diagram of a dedicated address capture cell.

A dedicated address capture cell 272 is shown in FIG. 17; all of the capture functions except user-defined capture are synthesized from these cells. Each cell is created with a pre-defined address. That address is used at the time of synthesis to connect the cell's input to the proper byte of the SONET word, and to build comparison logic that will cause the cell to latch when the block-global word counter specifies the word to which its address belongs. The cell has two bytes of storage 274, 276, one to hold the data captured in each frame, and one to hold the data being presented to the user. A transfer signal (Transfer) moves overhead from the capture space 274 to the display space 276. The force-store signal (Force Store) is for use in testing the SORCC 40. There is also a force-transfer test signal; it goes through the control circuitry.

Figure 18:
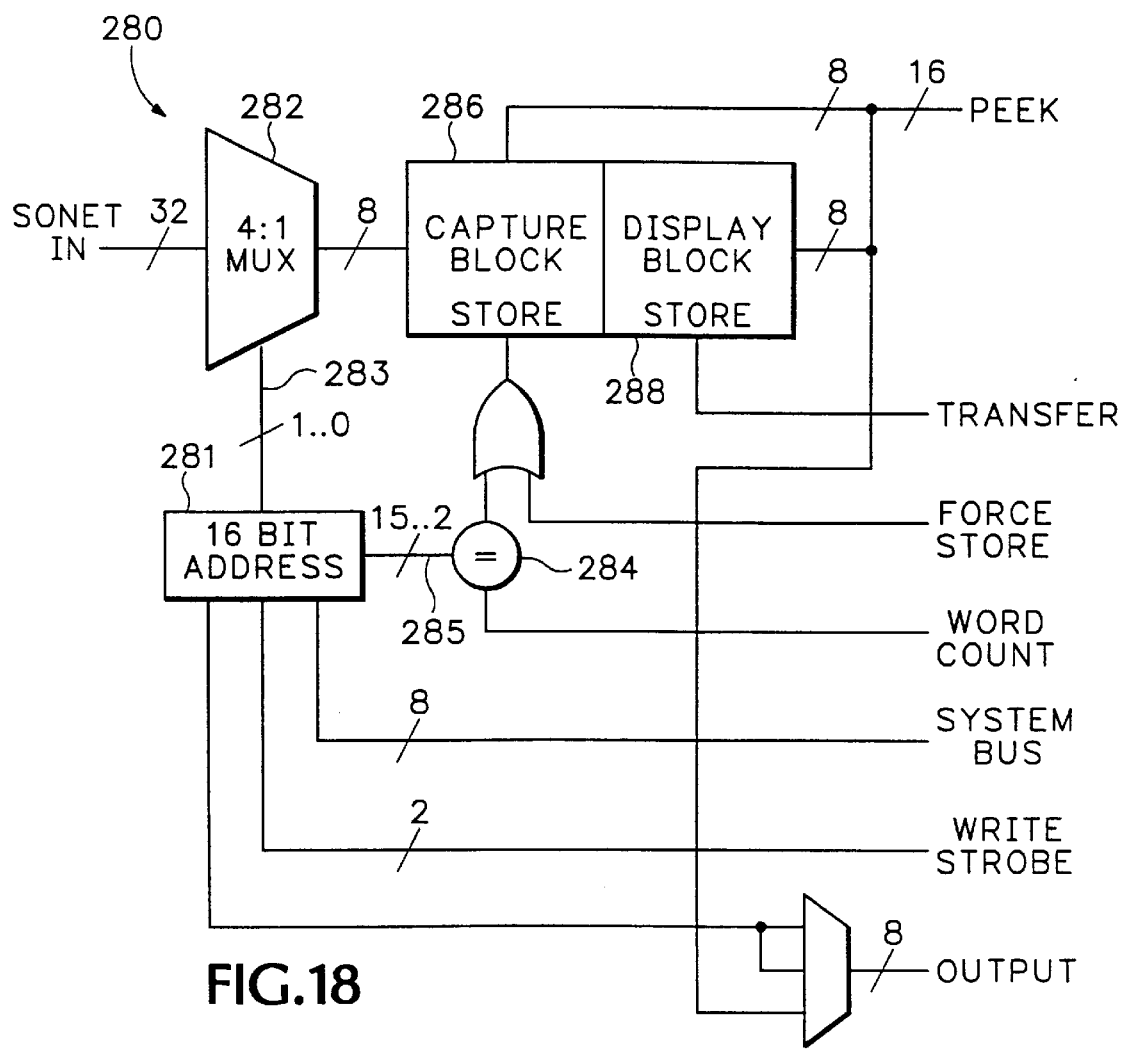
FIG. 18 is a logical block diagram of a programmable address capture cell.

The user-defined capture sub-block 280 uses a second cell design, shown in FIG. 18. This design differs from the dedicated capture cell 272 in that it has a programmable address 281. Instead of being permanently connected to one byte of the input word, a 4:1 multiplexer 282 driven by the low bits 283 of the address 281 selects the proper byte of the input words. The upper 14 bits 285 of the address 281 are compared by compare function 284 to the word count (Word Count) to determine when to latch the data.

The shared control circuitry decodes addresses from the parallel system bus 144 and generates write strobes for reprogramming the address 281 of the cells 286, 288 as necessary. The two address bytes themselves come in on the parallel system bus 144. One level of multiplexing is performed inside the capture cell, driven by externally generated enables, to provide a byte-wide output channel for data or address readout. Since the serial data interface bus 142 always needs to have access to the display data, even if the multiplexer is being used for address read back, a "peek" bus (Peek) is provided. To provide the option of triggering the snapshot circuitry on a change in user byte 1, this "peek" also extends to the captured data, so a change in user byte one can be detected by comparing the two peek bytes.

The overall operation of the overhead capture block 100 requires some coordination among the subsections. The control circuitry 270 generates a word count synchronized to the frame such that all the capture cells can latch data as previously described. It also generates the block-global transfer signal at the end of each frame if overhead update is enabled by the snapshot circuitry. This causes all of the cells to move captured data to presentation space. The force-store and force-transfer test signals also go through the control circuitry for synchronization and routing to all the cells. System and serial address decoding and tristate output bus driving are the responsibility of the individual sub-blocks.

The APS and user blocks 264, 268 contain some functions in addition to capture and read back. The user block 268 sources a trigger signal for the snapshot circuitry whenever the just-captured value of the U1 byte is not the same as its display value. The APS block contains filter circuitry that keeps track of the accepted K1/K2 value, the most recently received K1/K2 value, and the user-visible K1/K2 value. A received value becomes an accepted value if it is received in 3 or 5 consecutive frames (a control signal from the microprocessor interface specifies which). The user-visible K1/K2 values may differ from the accepted values just as the capture and display blocks of a normal capture cell may differ. The APS subsection exports the low three bits of the accepted K2 value to the AIS/FERF detect block, and generates a signal for the interrupt circuitry whenever the accepted value of the APS channel does not match the user-visible value (i.e., whenever the value of the APS channel changes). The filtered APS values are held constant when the IC is out-of-frame, so no spurious AIS, FERF, or interrupt signals will occur due to IC startup or resynchronization.

Figure 19:
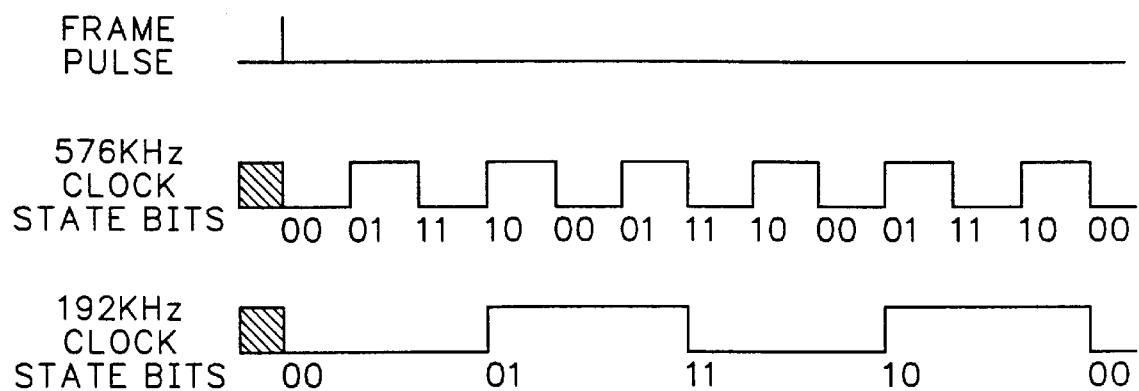
FIG. 19 is a signal timing diagram of clock generation in the serial overhead output block.

The serial overhead block 104 has two major functions: clock generation and data output control. It synthesizes four clocks synchronized to the serial output channels from the 77 MHz system clock. The 576 kHz, 192 kHz, and 64 kHz clocks are all divided out directly from the 77 MHz clock using terminal-count resettable counters, though they all require using both edges of the clock to achieve a 50% duty cycle. Since serial data is to be asserted on the falling edges of these clocks, they all have a falling edge at the beginning of each frame. The 576 kHz clock is generated first. On the falling edge that latches the incoming frame pulse, a two-bit state register is cleared, and a counter is started. 135 edges of the 77 MHz clock later, on a rising edge, one of the state bits is inverted. 135 edges after that, the other bit is inverted. From then on, every 135 rising edges the first bit is inverted, every 135 falling edges the second bit is inverted. The 576 kHz clock is the exclusive-or of the two state bits. The 192 kHz clock is generated similarly from the 576 kHz clock. Its state is cleared by the frame pulse, and then a bit is inverted every three edges of the 576 kHz clock. The 64 kHz clock is generated from the 192 kHz clock in exactly the same manner. As long as the length of the frame corresponds to an even number of cycles of these clocks (it does), resetting the state to zero on later frame pulses will be invisible in the output clock. FIG. 19 illustrates the process.

The clock for the serial output of the user defined capture bytes (SUCHCLK) must have 192 cycles per frame to accompany the 192 bits. This corresponds to a clock frequency of 1.536 MHz, which cannot be divided out of a 77.76 MHz clock. The closest match is one cycle of the user channel clock per 50 cycles of the system clock. The user clock is disabled for two of its cycles at the beginning of each frame to maintain the proper number of cycles per frame. The result is the gapped 1.5552 MHz serial user-defined channel clock.

The clocks of the serial block drive eight output channels. The section and line overhead and user channel bytes (E1, E2, F1) are streamed out on three channels at a rate of one byte per frame (64 kb/s) per channel. The section data communication channel (D1–D3) and parity error counts are streamed out on two channels at three bytes per frame (192 kb/s) per channel. The line data communication channel (D4–D12) is streamed out at nine bytes per frame (576 kb/s). The user capture channel is streamed out at 24 bytes per frame (1.536 Mb/s). For each of these output pipes there is an 8-bit shift register in the serial output block driven by the falling edges of the appropriate serial clock. Each register is loaded in parallel from the serial data bus on the falling edge after the last bit of a byte.

Figure 20:
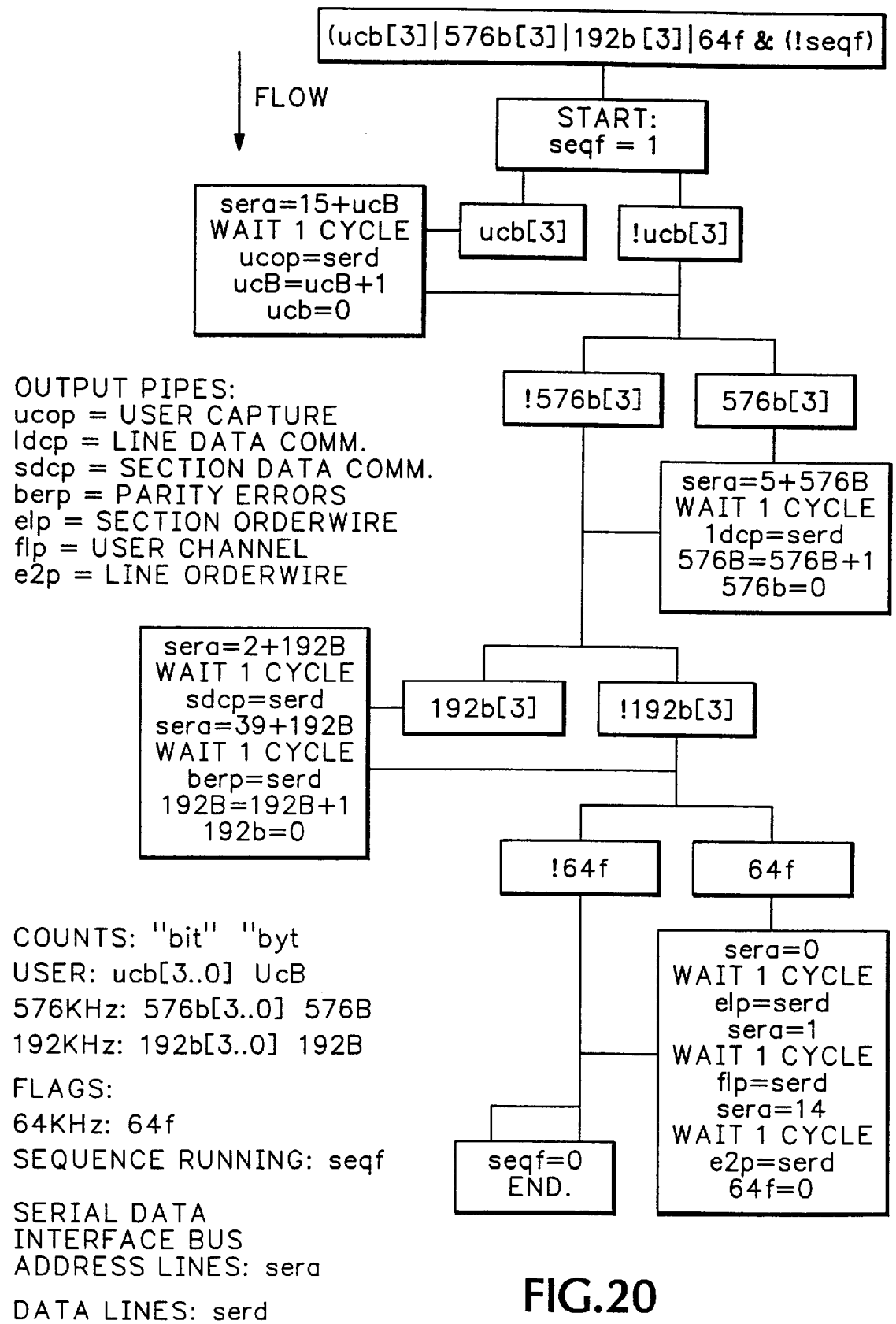
FIG. 20 shows the control flow in the serial output sequence machine.

Referring now to FIG. 20, a control-token sequence machine running off the system clock accomplishes the loading of the shift registers. With each of the three fast serial clocks is associated a four-bit "bit" counter and a "byte" counter of appropriate size. There is a one-bit flag associated with the 64 kHz clock. Each "bit" counter counts the falling edges of its clock. A sequence begins whenever any of the "bit" counters reaches 8 or when the slow channel's flag is set. The serial overhead output block's operation for a frame is as follows: the frame pulse clears all of the byte counters, sets all of the "bit" counters to 8, and sets the 64 kb/s channel's flag bit. This creates a start condition for the sequence machine.

The start of the sequence sets a flag that removes the start condition, preventing a second sequence process from being started while the first is still active. The control machine then goes through a set of steps for each of the serial output clocks, starting with the fastest. For each, it checks to see if the highest bit of the corresponding "bit" counter is set (or if the flag is set for the 64 kb/s clock). If so, it goes through a sequence of steps for each channel associated with that clock. First it drives the sum of the defined base address for the channel and the "byte" counter value onto the serial data interface bus address lines. The requested data appears on the data lines of that bus within about 15 ns, so at the end of the next cycle of the system clock the control machine asynchronously loads the channel's shift register with whatever value is on the bus. These two steps repeat for all channels associated with the clock, then the "byte" count is incremented and the "bit" count is cleared. After all channels have been checked, and loaded if necessary, the flag denoting a sequence in progress is cleared.

Since each step in the sequence machine's operation takes one cycle of the 77 MHz clock, all of this happens very quickly on the time scale of the output channels. Right after the frame pulse, the machine will find all bit counters set high and load all of the shift registers. After that, whenever a channel's bit counter reaches 8, it triggers a new pass through the sequence machine. At that time all channels that need loading will be loaded with the next byte from their address space, and the serial output operation will continue. Allowing one sequence machine to orchestrate the loading of all output pipes prevents contention on the serial data interface bus.

The line AIS insertion block 80 replaces most of the SONET stream with an all-ones pattern when activated via an external pin (LAIS). The only part of the stream left untouched is the section overhead 24 (FIG. 1), as the standards specify. The synchronization circuitry for this function is borrowed from the B2 calculation block 94: a control flag is toggled high and low according to the value of a frame-aligned counter. The logical "and" of this flag and the value of the LAIS pin drives a word-wide 2:1 multiplexer that selects for its output either the input SONET stream or a word comprised entirely of ones.

The scrambler 84 was derived using the same methodology described in the discussion of the descrambler 66. Instead of one 32-bit parallel sequence generator, the scrambler block creates a single 8-bit-wide parallel sequence generator, and applies the eight state bits to each of the four bytes of the SONET data word. This in effect forces the data stream into the format of four STS-12s: four scrambled one-byte channels running at 77.76 MHz is equivalent to four one-bit, serially scrambled channels running at 622.08 Mb/s. As in the descrambler, the generation of new state vectors and the application of old ones begins in the word after the last C1. The implementation is analogous. For the 8-bit parallel sequence generator, the seed state and transformation matrix are:

$S^T(8) = [C0\ C1\ C2\ C3\ C4\ C5\ C6\ C7]$ $S_O{}^T(8) = [0\ 1\ 1\ 1\ 1\ 1\ 1\ 1]$ $SP_{n+1}(8) = TRP_8 SP_n(8)$ $$TRP_8 = \begin{bmatrix} 0 & 0 & 0 & 0 & 1 & 0 & 1 & 0 \\ 1 & 0 & 0 & 0 & 0 & 1 & 1 & 0 \\ 1 & 1 & 0 & 0 & 0 & 0 & 0 & 0 \\ 0 & 1 & 1 & 0 & 0 & 0 & 0 & 0 \\ 0 & 0 & 1 & 1 & 0 & 0 & 0 & 0 \\ 0 & 0 & 0 & 1 & 1 & 0 & 0 & 0 \\ 0 & 0 & 0 & 0 & 1 & 1 & 0 & 0 \\ 0 & 0 & 0 & 0 & 0 & 1 & 1 & 0 \end{bmatrix}$$

The four principle functions of the microprocessor interface were listed previously: exerting control through the master control register, monitoring system signals and sourcing interrupts based on them, running the snapshot circuitry that enables and disables overhead update, and creating data acknowledgment signals during read and write accesses. The master control register contains eight bits, defined as follows. Bits 7 and 6 specify the position of the incoming frame pulse with respect to the A1A2 boundary in the incoming frames. These bits connect to the frame pulse delay block. Bit 5 sets the number of times in a row the same value must be received in the K1 or K2 byte before it is accepted as the new value for that byte. If it is set to one, the value will be accepted on the fifth reception, if zero, on the third. Bit four is an on/off "switch" for the descrambler. If it is high, the descrambler is activated. Bit three performs the same function for the scrambler. Bits two and one control the trigger event of the snapshot decision circuitry. Their function will be described later.

Bit 0 allows a chip-level reset to be performed without actually using the dedicated ~RESET pin. The SORCC 40 should always be reset on power-up; it might also prove useful to reset it to restore default settings at other times. If bit 0 is written low, or the dedicated ~RESET pin is driven low, a chip-level reset will be performed.

Timing is performed automatically for the master control register reset; if the dedicated pin is used, it should be held low for at least 100 ns.

The interrupt control circuitry communicates with the system through the interrupt mask register (IMR), the interrupt status register (ISR), the interrupt pin, and the interrupt acknowledge pin. An interrupt is sourced when the interrupt (~INT) pin is driven low by the interrupt control circuitry, and is pending until the control system acknowledges it by lowering the interrupt acknowledge (~IACK) pin. When an interrupt has been acknowledged, the ~INT pin is released and the ISR is cleared for one clock cycle. A new interrupt could be sourced immediately after that. Eight conditions are monitored: AIS, FERF, OOF, LOF, LOS, APS change, snapshot, and frame. The first five of these conditions are determined by the dedicated outputs of the same name. The APS change signal indicates that a new APS value has just been accepted by the filtering circuitry of the overhead capture block's APS subsystem, and will be readable after the next frame pulse (or immediately, through the unfiltered K1 and K2 registers). The snapshot signal indicates that overhead data update has stopped; that is, that the data made visible by the capture block will not change until the snapshot option is reset. The frame signal indicates that a new frame has begun. For each of these signals, there is a bit in each interrupt register. The IMR determines which of these signals may cause an interrupt. If a signal's bit is set in the IMR, the SORCC 40 will source an interrupt whenever none is pending and that signal is active (high). The ISR indicates the current value of the monitored signals when no interrupt is pending. When an interrupt is sourced, the ISR locks its version of the value of all those signals for which interrupts are enabled in the IMR. This allows the user to determine exactly what condition caused the interrupt by logically anding the values of the ISR and IMR. The ISR will continue to reflect the current status of signals for which interrupts are disabled. Acknowledging an interrupt does not necessarily clear the condition that caused it, so the controller may wish to adjust the IMR to disable interrupts based on the condition being acknowledged before asserting ~IACK.

The snapshot decision circuitry reads its setting from bits 2 and 1 of the master control register and from the snapshot activate (SNAP) pin. The SNAP pin overrides any other settings; if it is high, the overhead capture block will not be allowed to update its display cells. This takes effect immediately upon assertion of the pin. The snapshot controls in the master control register determine the behavior of overhead update when the SNAP pin is low. If both bits are low, overhead data will be updated with every new frame. If they are set to "01", the current frame's overhead will be transferred to visible space with the next frame pulse, then update will be inhibited. If they are set to "10", update will cease after the next frame in which the value of the first user-selectable capture byte changes. This option allows the host system to use any byte in the frame as a trigger for the capture of a frame's overhead. If the control bits are set to "11", overhead update will be blocked after the next frame during which an interrupt is sourced. This allows capture of the overhead of any frame that causes AIS, FERF, etc. Resetting the bits to "00" will re-initiate update after any of the other settings halts it. Since the AIS/FERF detect block receives a signal based on the currently accepted value of the K2 byte rather than its user-visible value, its operation is not compromised by activation of the snapshot circuitry.

The data acknowledge (~DTACK) signal exists to allow the SORCC 40 to interface with Motorola-type microprocessors and microcontrollers. When either a read or a write is begun by lowering chip select (~CS) and read enable (~RE), or by lowering ~CS and write enable (~WE) and applying valid data on the parallel system bus, a timing chain in the SORCC is activated. Three system clock edges later, the ~DTACK line is lowered, indicating that the transaction is ready to be completed. At that point the processor should raise the ~CS and ~RE or ~WE lines. In a write, data must remain valid until just after ~CS and ~WE go high. The ~DTACK signal has nothing to do with how data is actually read and written in the internal registers, it just supplies timing cues to the microprocessor that are appropriate to those operations.

Figure 21:
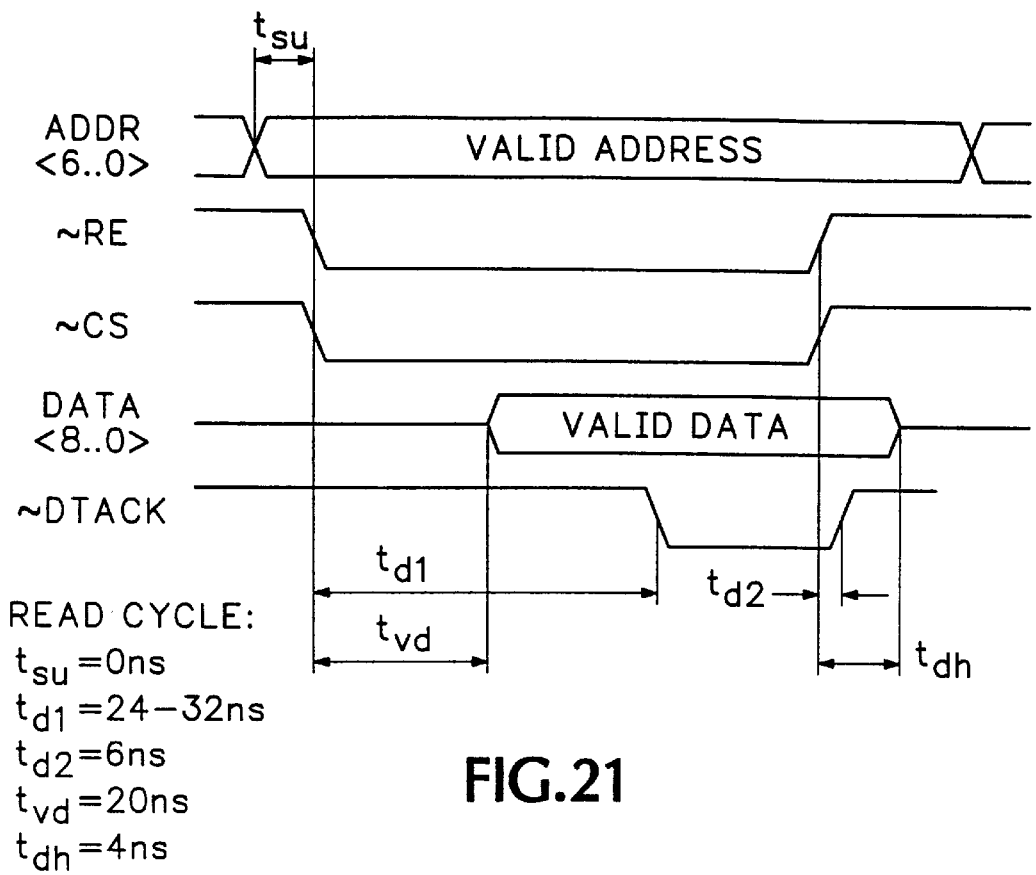
FIG. 21 is a signal timing diagram showing read access timing.

Much mention has been made of accessing user readable and writeable space through the parallel system bus 144. Although the physical memory within the SORCC 40 is distributed, the microprocessor interface 108 was assigned the responsibility for codifying the strategy for accessing it. An example read access proceeds as follows. The host system drives the desired address onto the address lines of the SORCC parallel system bus, then activates the ~RE and ~CS lines. In the case of a read access, it is acceptable for both these lines to drop immediately with the address. About 20 ns later, the data requested appears on the data lines of the bus. At that point the controller may latch the data, raise the ~RE and ~CS lines, and change the address. If the controller uses the ~DTACK interface, it will wait until the ~DTACK signal is lowered by the SORCC (about 24 ns after both ~CS and ~RE go low) to latch the data and raise the control lines. A read access is shown in FIG. 21. The timing specifications given are estimates based on preliminary simulation.

Figure 22:
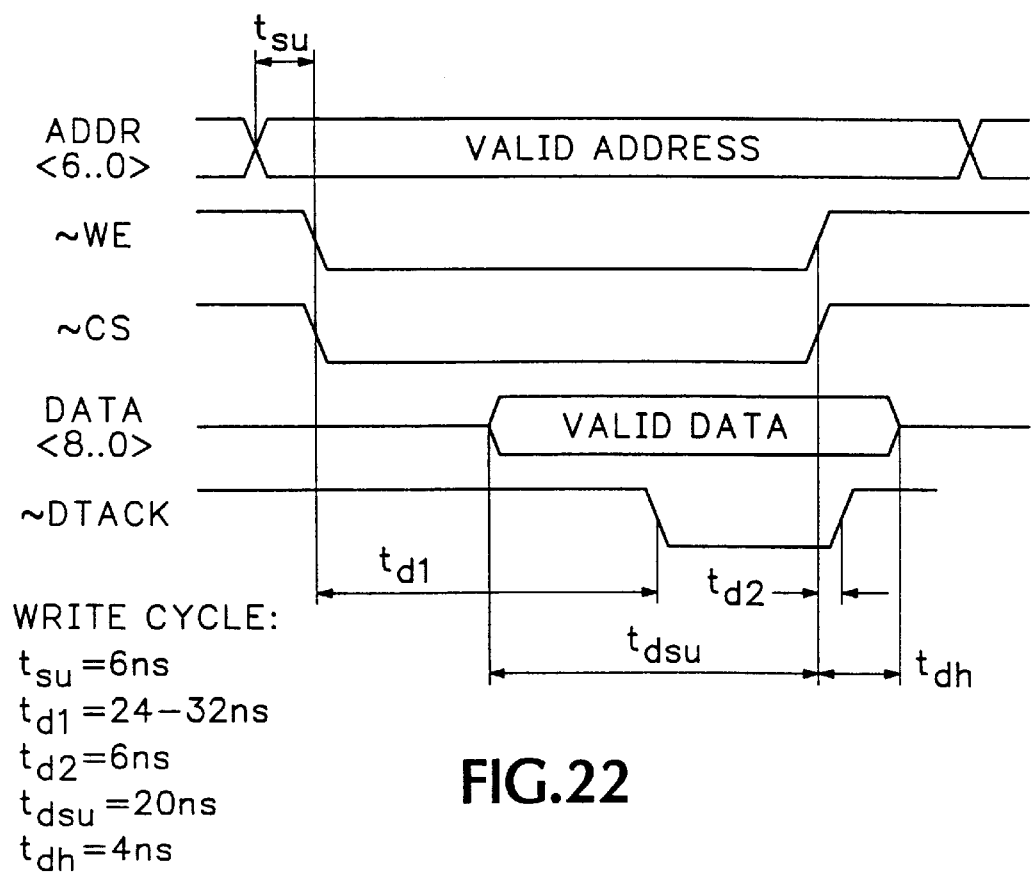
FIG. 22 is a signal timing diagram showing write access timing.

A write access is similar. The controller asserts an address, then lowers the ~WE and ~CS lines. In this case, a setup time of about 6 ns is required to ensure that only the proper address will be written. It is acceptable for one but not both of the control lines to be asserted before this time. Then the controller should assert the data to be written on the data bus. After 20 ns, the data will be stable in the proper latch in the SORCC 40, so the control lines can be deasserted. The data must be held for about 4 ns after the first control line is raised. Again, a system that uses the ~DTACK line would wait for that line to drop before releasing its control signals. The same overall data window and hold time requirements apply. FIG. 22 is a timing diagram for a write cycle. Again, the specifications shown are based on simulation data.

The AIS/FERF detection block 102 simply monitors the three bits created for it by the APS subsection of the overhead capture block 100, which correspond to the low bits of the currently accepted K2 byte. If they contain the alarm indication signal code, "111," the AIS pin is raised. If they contain the far end receive failure code, "110," the FERF pin is raised. If neither of these values is encoded, both the AIS and FERF pins are lowered. The outputs of this block are latched to prevent glitches.

The architecture and design presented in the previous sections specify a processor that implements the framing and de-interleaving functions necessary to recover four 622 Mb/s SDH/SONET streams, output on byte-wide 77.76 MB/s channels, from a 2.488 Gb/s SDH/SONET input stream, entering on a 16-bit channel at 155.52 Mb/s per line. These specifications were encoded in a Tektronix proprietary hardware description language, compiled to a netlist of standard cells from the Tektronix CMOS library, and subjected to extensive simulation with library default parasitic capacitance values. The resulting circuit was fabricated in National Semiconductor's 0.8 micron CMOS process and has been demonstrated working without error at 77 MHz.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. A SONET/SDH receiver processor for receiving an input SONET/SDH OC-48 signal, comprising:

(a) a 16:32 demultiplexer receiving the input SONET/SDH signal;

(b) a descrambler connected to an output of said 16:32 demultiplexer; and (b) cross-connect means, connected to an output of said descrambler, for rearranging selected STS-12 signal components contained within the input SONET/SDH signal.

2. The SONET/SDH receiver processor as recited in claim 1 wherein the cross-connect means comprises:

a matrix of storage/switching elements for receiving the input SONET/SDH signal; and control circuitry for synchronizing the storage/switching elements to the frame structure of the SONET/SDH signal.

3. The SONET/SDH receiver processor as recited in claim 2 wherein the storage/switching elements of the storage/switching matrix are arranged in rows respectively coupled to an output bus and columns with each storage/switching element having a bank number for determining whether the storage/switching element belongs to the column for driving the output bus.

4. The SONET/SDH receiver processor as recited in claim 2 wherein each storage/switching elements comprises:

at least two blocks of data storage connected in common for reading and writing selected bytes of the SONET/SDH signal in response to read and write enable signals and a clock signal;

at least two address latches coupled to the control circuitry for respectively holding a current address defining a current cross-connect pattern and an update address defining a new cross-connect pattern;

a multiplexer responsive to a first portion of the current address for selecting a selected byte of the SONET/SDH signal; and control logic coupled to the blocks of data storage for generating the read and write enable signals in response to a word count being respectively compared to the bank number and the word count being compared to a second portion of the current address with a block select signal determining which block of data storage is written into and read from at any point in time.

5. The SONET/SDH receiver processor as recited in claim 1 wherein the descrambler further comprises:

a state vector register for receiving a state vector; and a next state generator coupled to receive the state vector at an input for generating a new state vector by performing an exclusive-or function on the input state vector using a parallel implemented transformation matrix and coupling the new state vector to the state vector register.

6. The SONET/SDH receiver processor as recited in claim 5 wherein the descrambler further comprises timing circuitry for synchronously setting the state vector to the frame structure of the SONET/SDH signal and initiating loading of the state vector into the state vector register on each cycle of a clock input.

7. The SONET/SDH receiver processor as recited in claim 5 wherein the state vector register comprises a plurality of flip-flops having a plurality of bits.

8. The SONET/SDH receiver processor as recited in claim 7 wherein the state vector register comprises a plurality of flip-flops equalling thirty-two bits.

9. A SONET/SDH receiver processor for receiving an input SONET/SDH OC-48 signal comprising:

a descrambler having a state vector register for receiving a state vector and a next state generator coupled to receive the state vector at an input for generating a new state vector by performing an exclusive-or function on the input state vector using a parallel implemented transformation matrix and coupling the new state vector to the state vector register; and a cross connect having a matrix of storage/switching elements for receiving the input SONET/SDH signal and control circuitry for synchronizing the storage/switching elements to the frame structure of the SONET/SDH signal, each storage/switching element having at least two blocks of data storage connected in common for reading and writing selected bytes of the SONET/SDH signal in response to read and write enable signals and a clock signal, at least two address latches coupled to the control circuitry for respectively holding a current address defining a current cross-connect pattern and an update address defining a new cross-connect pattern, a multiplexer responsive to a first portion of the current address for selecting a selected byte of the SONET/SDH signal, and control logic coupled to the blocks of data storage for generating the read and write enable signals in response to a word count being respectively compared to the bank number and the word count being compared to a second portion of the current address with a block select signal determining which block of data storage is written into and read from at any point in time.

10. The SONET/SDH receiver processor as recited in claim 9 wherein the descrambler further comprises timing circuitry for synchronously setting the state vector to the frame structure of the SONET/SDH signal and initiating loading of the state vector into the state vector register on each cycle of a clock input.

11. The SONET/SDH receiver processor as recited in claim 9 wherein the state vector register comprises a plurality of flip-flops having a plurality of bits.

12. The SONET/SDH receiver processor as recited in claim 11 wherein the state vector register comprises a plurality of flip-flops equalling thirty-two bits.

13. The SONET/SDH receiver processor as recited in claim 9 wherein the storage/switching elements of the storage/switching matrix are arranged in rows respectively coupled to an output bus and columns with each storage/switching element having a bank number for determining whether the storage/switching element belongs to the column for driving the output bus.

14. A cross-connect for use in a SONET/SDH receiver processor receiving an input SONET/SDH signal comprising:

a matrix of storage/switching elements for receiving the input SONET/SDH signal; and control circuitry for synchronizing the storage/switching elements to the frame structure of the SONET/SDH signal, each storage/switching element having at least two blocks of data storage connected in common for reading and writing selected bytes of the SONET/SDH signal in response to read and write enable signals and a clock signal, at least two latches coupled to the control circuitry for respectively holding a current address defining a current cross-connect pattern and an update address defining a new cross-connect pattern, a multiplexer responsive to a first portion of the current address for selecting a selected byte of the SONET/SDH signal, and control logic coupled to the blocks of data storage for generating the read and write enable signals in response to a word count being respectively compared to the bank number and the word count being compared to a second portion of the current address with a block select signal determining which block of data storage is written into and read from at any point in time.

15. The cross-connect as recited in claim 14 wherein the storage/switching elements of the storage/switching matrix are arranged in rows respectively coupled to an output bus and columns with each storage/switching element having a bank number for determining whether the storage/switching element belongs to the column for driving the output bus.

* * * * *

UNITED STATES PATENT AND TRADEMARK OFFICE
CERTIFICATE OF CORRECTION

PATENT NO : 5,923,653
DATED : July 13, 1999
INVENTOR(S): I. Claude Denton It is certified that error appears in the above-identified patent and that said Letters Patent are hereby corrected as shown below:

Column 1, after line 5 insert the following:

"STATEMENT REGARDING FEDERALLY SPONSORED RESEARCH OR DEVELOPMENT

This invention was made with Government support under Agreement No. MDA 972-94-3-0033 awarded by DARPA. The Government has certain rights in the invention."

Signed and Sealed this

First Day of May, 2001

*Attest:*

NICHOLAS P. GODICI

*Attesting Officer*  Acting Director of the United States Patent and Trademark Office